(12) United States Patent
Rathi et al.

(10) Patent No.: US 10,639,540 B2
(45) Date of Patent: May 5, 2020

(54) AUGMENTED AND/OR VIRTUAL REALITY FOOTWEAR

(71) Applicant: GOOGLE LLC, Mountain View, CA (US)

(72) Inventors: Nidhi Rathi, San Francisco, CA (US); Maksim Ratner, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 114 days.

(21) Appl. No.: 15/975,242

(22) Filed: May 9, 2018

(65) Prior Publication Data

US 2018/0326286 A1 Nov. 15, 2018

Related U.S. Application Data

(60) Provisional application No. 62/503,543, filed on May 9, 2017.

(51) Int. Cl.
*A63B 71/06* (2006.01)
*G06F 3/01* (2006.01)
(Continued)

(52) U.S. Cl.
CPC ........ *A63B 71/0622* (2013.01); *A43B 3/0005* (2013.01); *A43B 5/1641* (2013.01);
(Continued)

(58) Field of Classification Search
CPC ................ A63B 71/0622; A63B 22/20; A63B 2071/0644; A43B 5/1641; A43B 3/0005;
(Continued)

(56) References Cited

U.S. PATENT DOCUMENTS

| 1,672,700 A | * | 6/1928 | Gabor | A63C 17/02 |
|---|---|---|---|---|
| | | | | 280/11.31 |
| 3,432,471 A | * | 3/1969 | Wolf | C08G 2/26 |
| | | | | 525/472 |

(Continued)

FOREIGN PATENT DOCUMENTS

| KR | 20120052520 A | 5/2012 |
|---|---|---|
| KR | 101625591 B1 | 6/2016 |

(Continued)

OTHER PUBLICATIONS

Invitation to Pay Additional Fees for PCT Application No. PCT/US2018/031813, mailed on Jul. 24, 2018, 9 pages.

*Primary Examiner* — Garrett K Atkinson
(74) *Attorney, Agent, or Firm* — Brake Hughes Bellermann LLP

(57) ABSTRACT

A physical position of motorized footwear in a physical environment may be tracked, and movement of the footwear may be translated into corresponding movement in a virtual environment. When a distance between the motorized footwear and a boundary of an operational zone defined in the physical environment is less than or equal to a threshold distance, a motor of the motorized shoe may be actuated. Actuation of the motor may in turn actuate a locomotion device of the motorized footwear, to move the motorized footwear back into a return zone defined within the operational zone. This may allow the user to walk, seemingly endlessly in the virtual environment, while remaining within a defined physical space in the physical environment.

20 Claims, 23 Drawing Sheets

(51) Int. Cl.
*A63B 22/20* (2006.01)
*A43B 5/16* (2006.01)
*A43B 3/00* (2006.01)
*A63C 17/12* (2006.01)
*A63C 17/02* (2006.01)

(52) U.S. Cl.
CPC .............. *A63B 22/20* (2013.01); *A63C 17/12* (2013.01); *G06F 3/011* (2013.01); *A63B 2071/0644* (2013.01); *A63C 17/02* (2013.01); *G06F 2203/012* (2013.01)

(58) Field of Classification Search
CPC ......... A63C 17/12; A63C 17/02; G06F 3/011; G06F 2203/012
See application file for complete search history.

(56) References Cited

U.S. PATENT DOCUMENTS

| | | | | |
|---|---|---|---|---|
| 3,809,173 A * | 5/1974 | McLeod | ................ | A63C 5/085 180/181 |
| 3,876,032 A * | 4/1975 | Ferino | ................... | A63C 17/10 180/181 |
| 4,508,187 A * | 4/1985 | Wenzel | ................ | A63C 17/26 180/181 |
| 4,861,054 A * | 8/1989 | Spital | ................... | A63C 17/015 280/221 |
| 5,195,604 A * | 3/1993 | Brockett | ........... | B60K 17/3505 180/244 |
| 5,236,058 A * | 8/1993 | Yamet | ................... | A63C 17/12 180/181 |
| 5,305,846 A * | 4/1994 | Martin | ................... | A63C 5/085 180/181 |
| 5,382,052 A * | 1/1995 | Tarng | .................... | A63C 1/306 280/11.27 |
| 5,390,958 A * | 2/1995 | Soo | ........................ | A63C 17/10 280/11.27 |
| 5,580,096 A * | 12/1996 | Freilich | ................. | A63C 17/10 280/844 |
| 5,730,241 A * | 3/1998 | Shyr | ...................... | A63C 17/10 180/181 |
| 5,797,466 A * | 8/1998 | Gendle | ................ | A63C 17/265 180/181 |
| 5,829,543 A * | 11/1998 | Diaz | ...................... | A63C 17/12 180/181 |
| 5,882,018 A * | 3/1999 | Petrosino | ............... | A63C 17/20 280/11.207 |
| 5,934,706 A * | 8/1999 | Yiu | ........................ | A63C 17/10 280/11.26 |
| 6,059,062 A * | 5/2000 | Staelin | ................... | A63C 17/12 180/181 |
| 6,086,072 A * | 7/2000 | Prus | ...................... | A43B 5/1658 280/11.28 |
| 6,135,928 A * | 10/2000 | Butterfield | .............. | G06F 3/011 482/66 |
| 6,152,854 A * | 11/2000 | Carmein | ............... | A63B 22/025 482/4 |
| 6,428,050 B1 * | 8/2002 | Brandley | ................ | A63C 17/12 280/11.19 |
| 6,435,290 B1 * | 8/2002 | Justus | ...................... | A63C 5/08 180/181 |
| 6,736,412 B1 * | 5/2004 | Krah | ...................... | A63C 17/065 280/11.224 |
| 7,383,908 B2 * | 6/2008 | Tuli | ...................... | A43B 3/0005 180/181 |
| 7,610,972 B2 * | 11/2009 | Adams | ................. | A63C 17/008 180/180 |
| 7,780,573 B1 * | 8/2010 | Carmein | ............ | A63B 22/0242 482/4 |
| 7,900,731 B2 * | 3/2011 | McKinzie | ............ | A63C 17/008 180/181 |
| 8,006,795 B2 * | 8/2011 | Manor | ................. | A43B 3/0005 180/181 |
| 8,636,627 B2 * | 1/2014 | Zhang | ................... | A61B 5/1124 482/52 |
| 8,675,018 B2 * | 3/2014 | Mishra | ................... | B65G 13/10 345/629 |
| 9,056,240 B2 * | 6/2015 | Carrell | ................. | A63C 17/061 |
| 9,295,302 B1 * | 3/2016 | Reed | ....................... | A43B 7/14 |
| 9,674,435 B1 * | 6/2017 | Monari | ................. | H04N 13/243 |
| 9,821,465 B2 * | 11/2017 | Stephens, Jr. | ......... | B25J 9/1689 |
| 9,919,200 B2 * | 3/2018 | Mo | ......................... | A63C 17/12 |
| 10,443,262 B2 * | 10/2019 | Evans | .................... | E04H 14/00 |
| 2009/0058855 A1 * | 3/2009 | Mishra | ................... | B65G 13/10 345/427 |
| 2010/0145233 A1 * | 6/2010 | Zhang | ................... | A61B 5/1124 600/592 |
| 2013/0025955 A1 * | 1/2013 | Chavand | ................. | A63C 17/12 180/181 |
| 2014/0262576 A1 * | 9/2014 | Tuli | ...................... | A43B 3/0005 180/167 |
| 2016/0280195 A1 * | 9/2016 | Kull | ........................ | B60T 7/16 |
| 2018/0320402 A1 * | 11/2018 | Evans | ..................... | B60L 53/14 |
| 2019/0310641 A1 * | 10/2019 | Matsuzawa | ............ | A01D 34/82 |

FOREIGN PATENT DOCUMENTS

| | | |
|---|---|---|
| WO | 2016202109 A1 | 12/2016 |
| WO | 2018090135 A1 | 5/2018 |

* cited by examiner

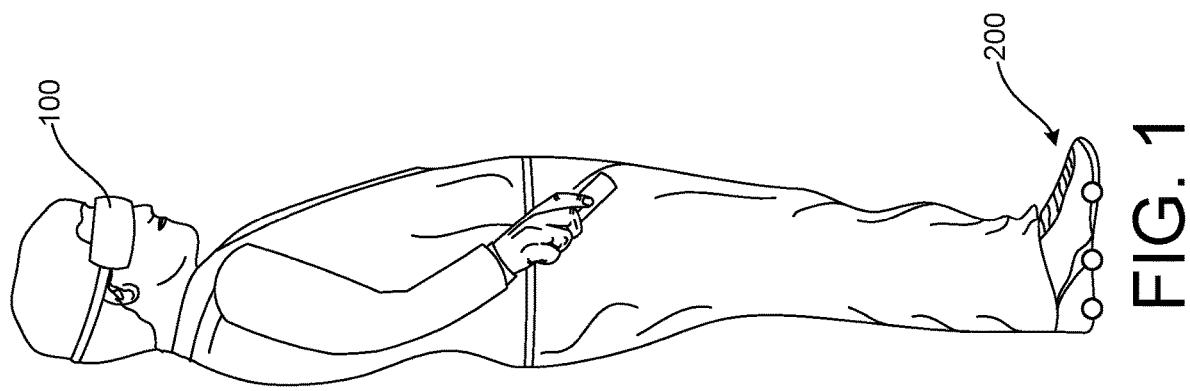

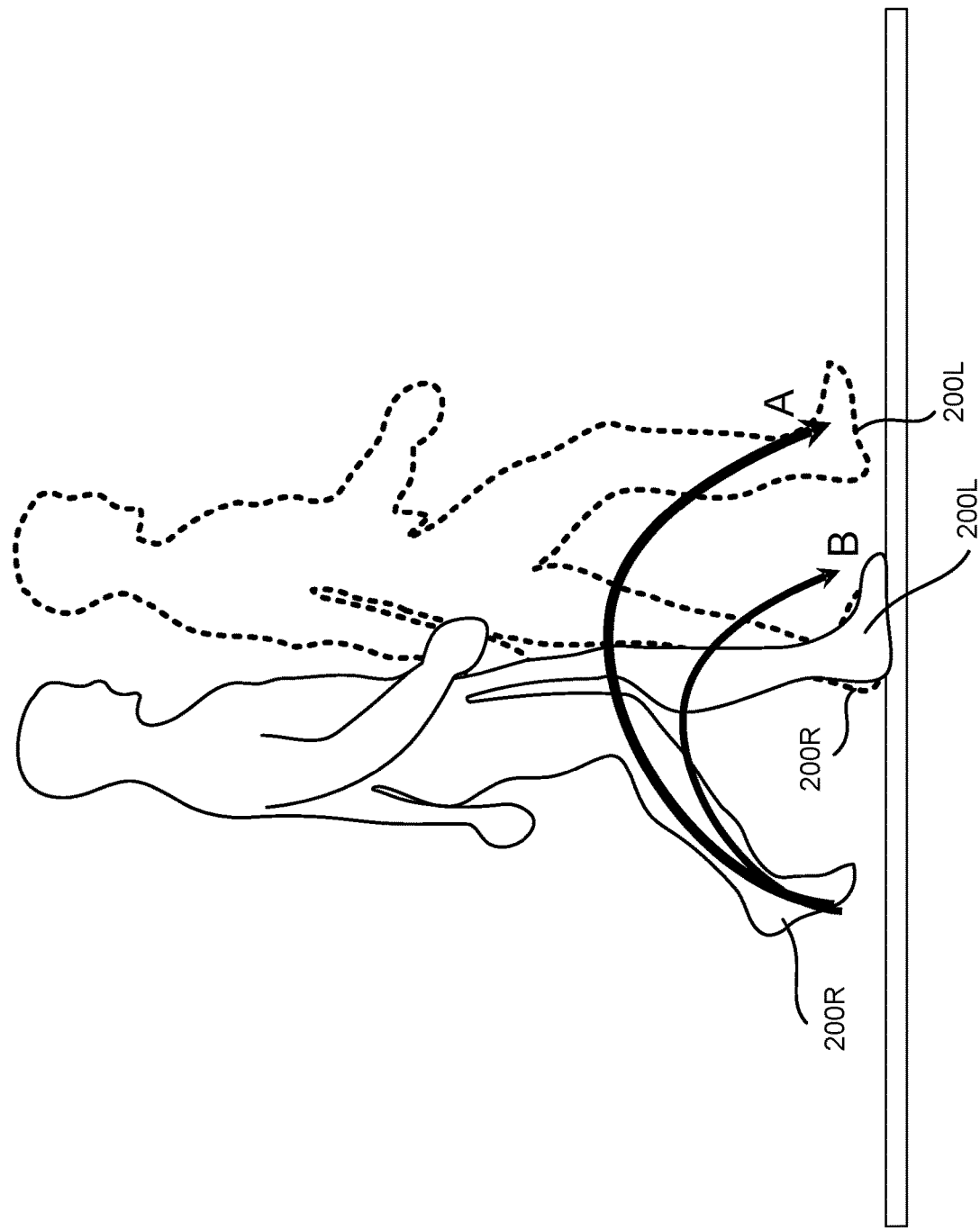

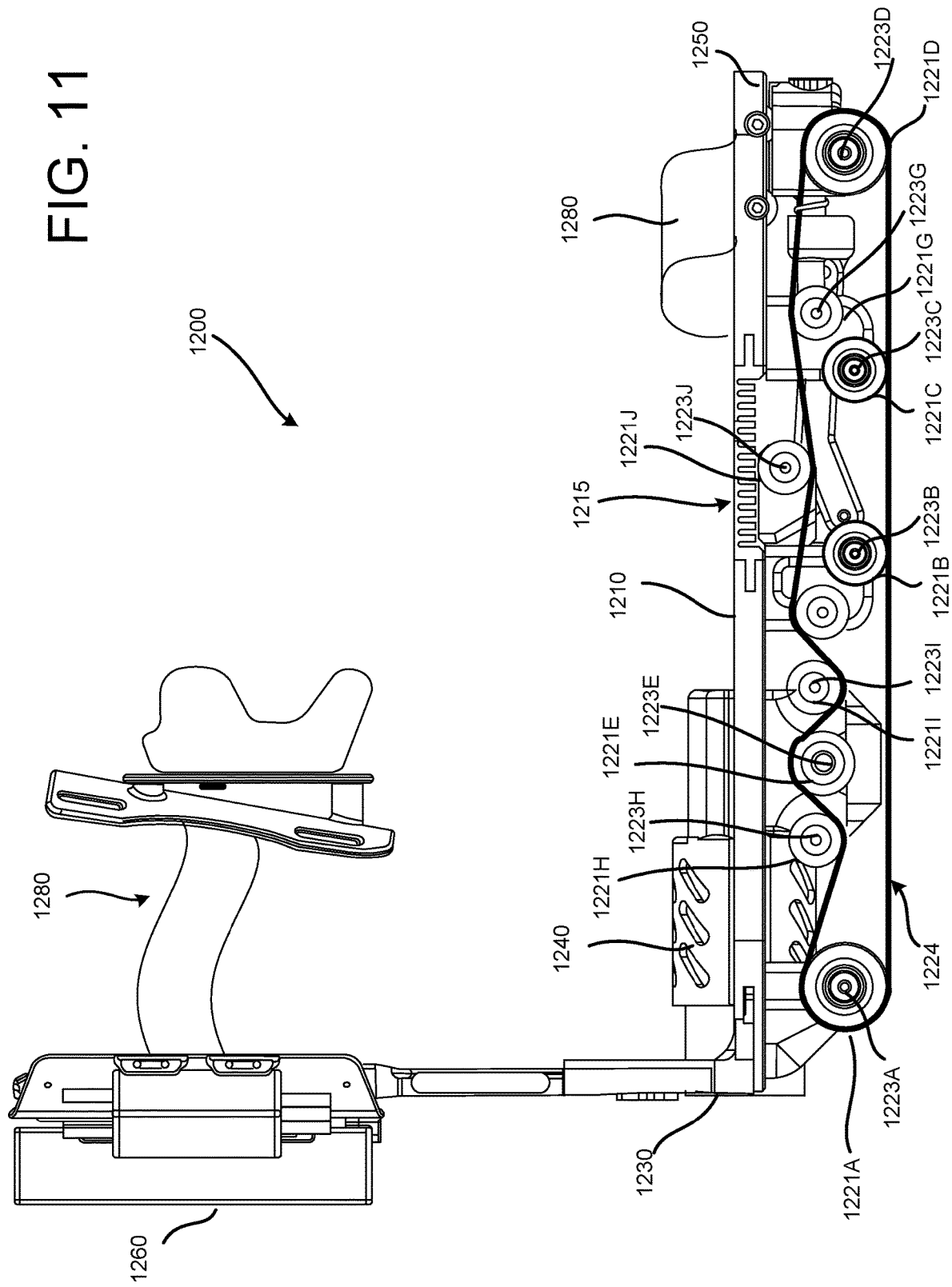

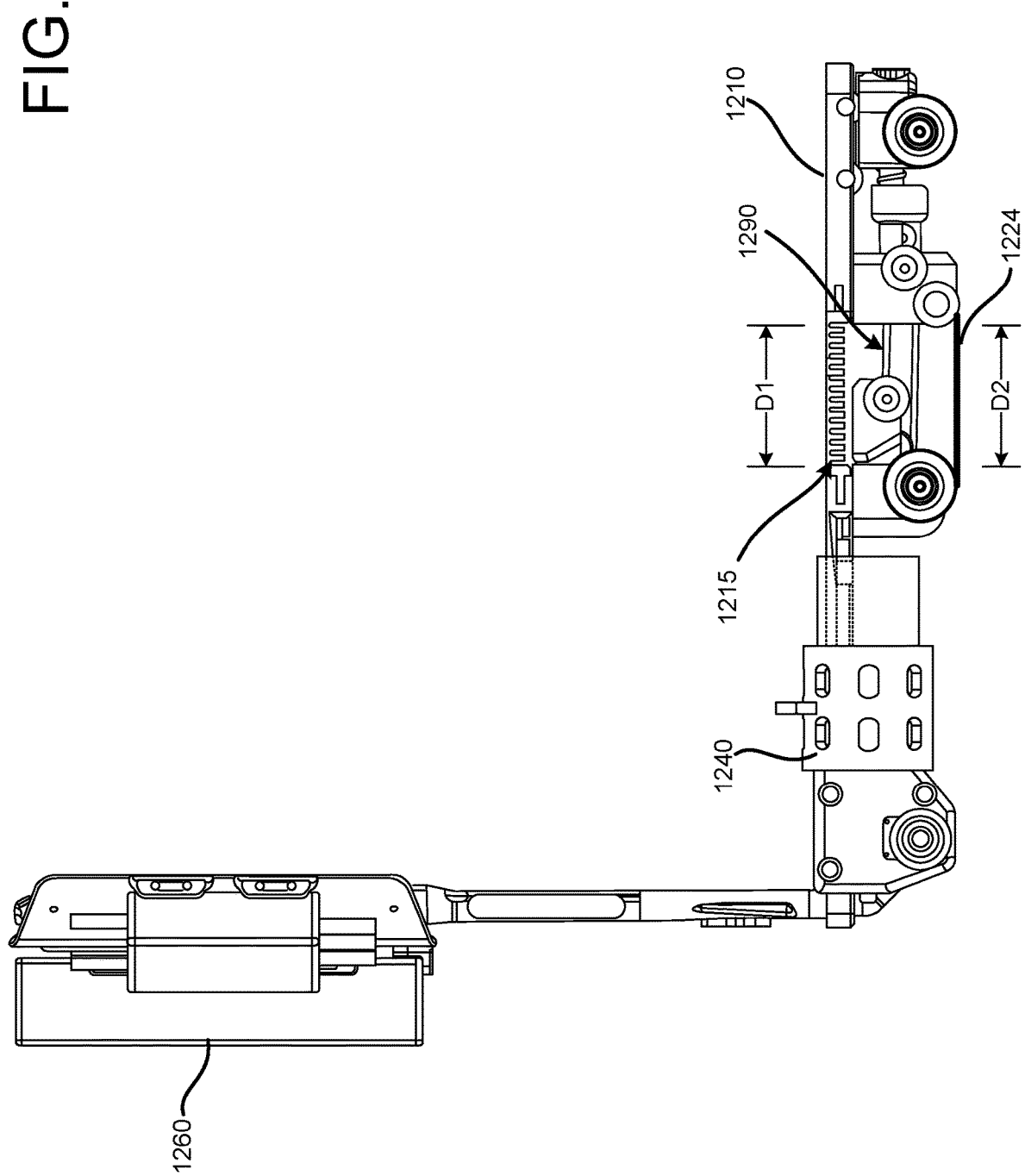

AUGMENTED AND/OR VIRTUAL REALITY FOOTWEAR

CROSS REFERENCE TO RELATED APPLICATION

This application is a Non-Provisional of, and claims priority to, U.S. Provisional Application No. 62/503,543, filed on May 9, 2017, the disclosure of which is incorporated by reference herein in its entirety.

FIELD

This document relates, generally, to movement in an augmented and/or a virtual reality system.

BACKGROUND

An augmented reality (AR) and/or virtual reality (VR) system may generate a three-dimensional (3D) immersive environment. A user may experience this 3D immersive virtual environment through interaction with various electronic devices, such as, for example, a helmet or other head mounted device including a display, glasses or goggles that a user looks through when viewing a display device, gloves fitted with sensors, external handheld devices that include sensors, and other such devices. Once immersed in the virtual environment, the user may move through the virtual environment, and may interact with objects and features in the virtual environment using various different input methods. Physical boundaries of and/or physical obstacles in the physical environment in which the system is operated may affect a user's ability to move or interact within the physical environment while immersed in the virtual environment.

SUMMARY

In one aspect, a motorized shoe assembly may include a platform; a flex region provided on a bottom surface portion of the platform, the platform being configured to flex at the flex region through a range of flexure, between a neutral state and a fully flexed state; and a locomotion device coupled to the bottom surface portion of the platform. The locomotion device may include a plurality of wheels; and at least one belt coupled to the plurality of wheels, the plurality of wheels configured to guide movement of the at least one belt. The motorized shoe assembly may also include a motor coupled to the platform and selectively providing power to the locomotion device to selectively operate the locomotion device; and a linkage assembly coupled to the bottom surface portion of the platform, and coupled to the locomotion device, the linkage assembly being configured to maintain a target amount of tension on the at least one belt through the range of flexure of the platform.

In another aspect, a method may include tracking a physical position of at least one motorized shoe in a physical environment; detecting a distance between the at least one motorized shoe and a physical boundary of a physical operational zone defined in the physical environment; comparing the detected distance to a threshold distance; actuating a locomotion device of the at least one motorized shoe in response to a detection of the at least one motorized shoe within the threshold distance to the physical boundary of the physical operational zone when the detected distance is less than or equal to the threshold distance based on the comparison; and moving the at least one motorized shoe into a physical return zone defined within the physical operational zone in response to actuation of the locomotion device to maintain a physical position of the at least one motorized shoe within the physical operational zone.

In another aspect, a motorized shoe assembly may include motorized shoe assembly may include a platform; a motor; a locomotion device coupled to the platform; a power transmission device coupling the motor and the locomotion device; and a processing device operably coupling the motorized shoe assembly with an external computing device. The processing device may include a tracking device that is trackable by the external computing device for tracking a physical position of the motorized shoe assembly; a processor; and a non-transitory computer-readable storage medium. The non-transitory computer-readable storage medium may store instructions that, when executed, cause the processor to detect a distance between the motorized shoe assembly and a physical boundary of a physical operational zone defined in a physical environment that is less than or equal to a threshold distance; actuate the motor in response to the detection of the motorized shoe assembly within the threshold distance to the boundary of the operational zone; and move the motorized shoe assembly in toward a physical return zone defined within the physical operational zone in response to actuation of the motor to maintain a position of the motorized shoe within the physical operational zone.

The details of one or more implementations are set forth in the accompanying drawings and the description below. Other features will be apparent from the description and drawings, and from the claims.

BRIEF DESCRIPTION OF THE DRAWINGS

FIG. 1 is an example implementation of an augmented and/or virtual reality system.

FIGS. 4A-4B illustrate an exemplary stride of a user.

FIG. 11 illustrates an example motorized footwear assembly, in accordance with implementations described herein.

FIGS. 12A-12D illustrate neutral and flexed states of the example motorized footwear assembly shown in FIG. 11, in accordance with implementations described herein.

DETAILED DESCRIPTION

Figure 2A:
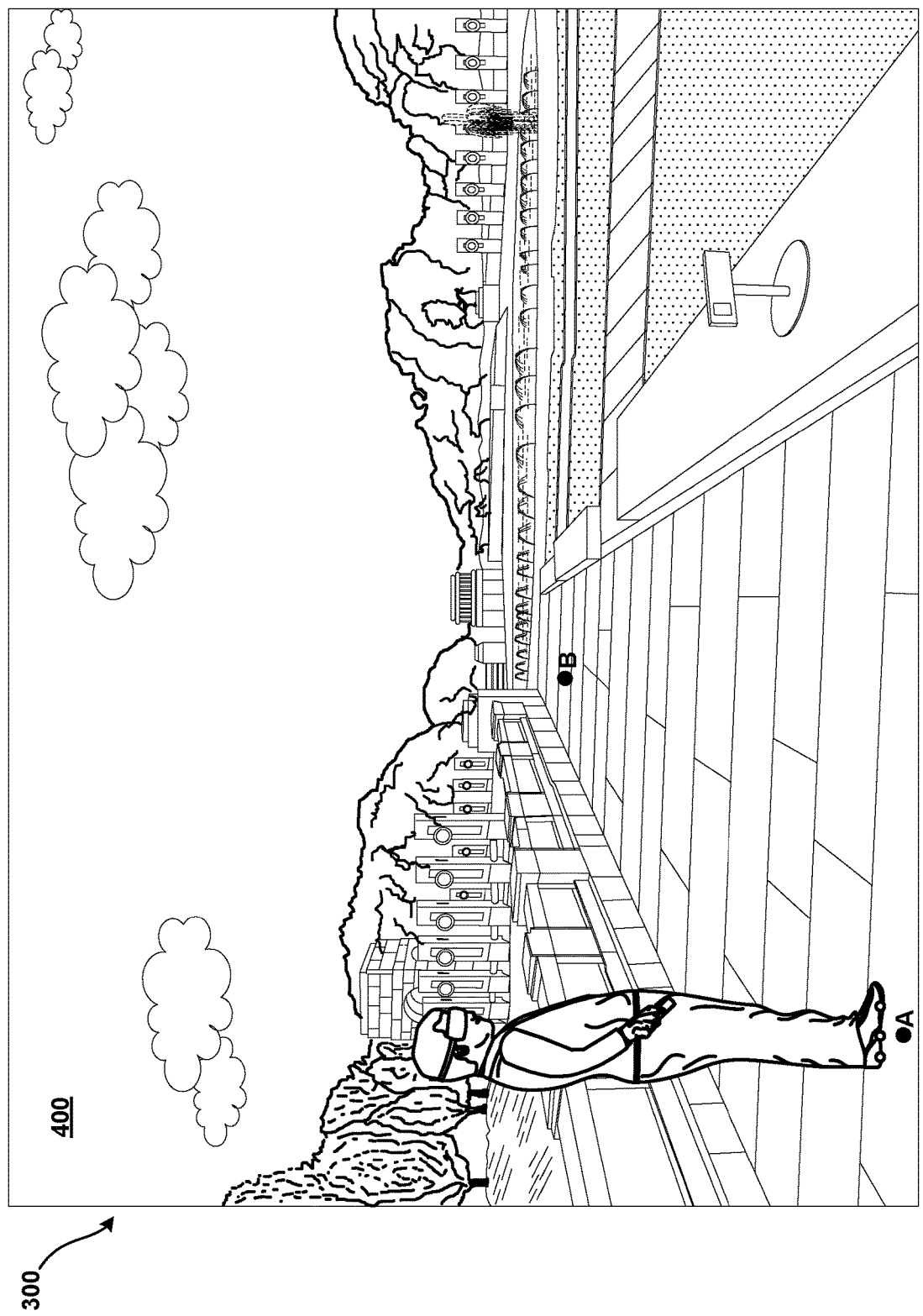
FIGS. 2A-2B illustrate operation of an example augmented and/or virtual reality system, in accordance with implementations described herein.

A Virtual Reality (VR) system and/or an Augmented Reality (AR) system may include, for example, a head mounted display (HMD) device or similar device worn by a user, for example, on a head of the user, to generate an immersive virtual environment to be experienced by the user. Movement of the user in the real world environment, or physical environment, may be translated into corresponding movement in the virtual world environment. The physical boundaries of the real world, such as, for example, the confines of a room in which the system is operating, and/or objects in the room, may disrupt and/or limit the user's continued physical movement in the physical environment, and, consequently may limit the user's corresponding continued movement in the virtual environment. A system in which a user may move seemingly endlessly within the fixed confines of the physical environment may provide a substantially continuous, uninterrupted virtual experience as the user's physical movement in the physical environment is translated into virtual movement in the virtual environment. The ability to move continuously and uninterrupted within the virtual environment may enhance a user's enjoyment of and immersion in the virtual environment. Such a system may help to avoid disorientation and/or other discomfort, such as motion sickness, which may occur as the user immersed in the virtual environment encounters a physical boundary and/or must reorient to continue to move in the virtual environment.

In a system and method, in accordance with implementations described herein, motorized footwear may be tracked by the system as the user physically moves, for example, walks, in the physical environment. The physical movement can be translated into virtual movement in the virtual environment. Motor mechanisms of the motorized footwear may be actuated, based on, for example, a detected physical position in the physical environment of the footwear. The motor mechanisms of the motorized footwear can be configured to move the user back into a defined physical area in the physical environment. This automated, motorized return of the user back (e.g., physically back) into the defined physical area by the motorized footwear, may allow the user to continue to move, or walk, in the physical environment, and to virtually move in the virtual environment, seemingly unconstrained.

FIG. 1 illustrates a user wearing an example head mounted display (HMD) device 100, and example motorized footwear 200, or motorized shoes 200. The HMD 100 may display, for example, within the confines of the HMD 100, a virtual environment to be experienced by the user. A physical position and movement of the shoes 200 in the physical environment may be tracked as the user experiences the virtual environment. In response to detection of the shoes 200 outside of a defined physical area, or zone, in the physical environment, one, or both of the locomotion devices of the shoes 200 may be activated to move (e.g., physically move, convey) the user back into the defined physical area, or zone. As the defined physical area, or zone, may be free of physical boundaries and/or obstacles, this may allow the user to continue to move, or walk, within the defined physical area, or zone, substantially uninhibited. This substantially uninhibited, or uninterrupted physical movement of the user in the defined physical area may be translated into corresponding movement in the virtual environment, thus expanding and enhancing the user's experience in the virtual environment.

In some implementations, the motorized shoes 200 may be in communication with the HMD 100, and/or another external computing device of the system. The HMD 100 and/or the external computing device may monitor the physical position and/or movement of the shoes 200, and may control actuation of the motor mechanism(s) of the shoes 200 to move (e.g., physically move) the user back into the defined physical area. The HMD 100 and/or the external computing device may also correlate physical movement of the user (for example, tracked physical movement of the shoes 200 and/or tracked physical movement of the HMD 100) to movement in the virtual environment. The system may adjust and/or advance a virtual scene displayed to the user in the virtual environment based on the correlation between the tracked physical movement and the virtual movement.

Figure 2B:
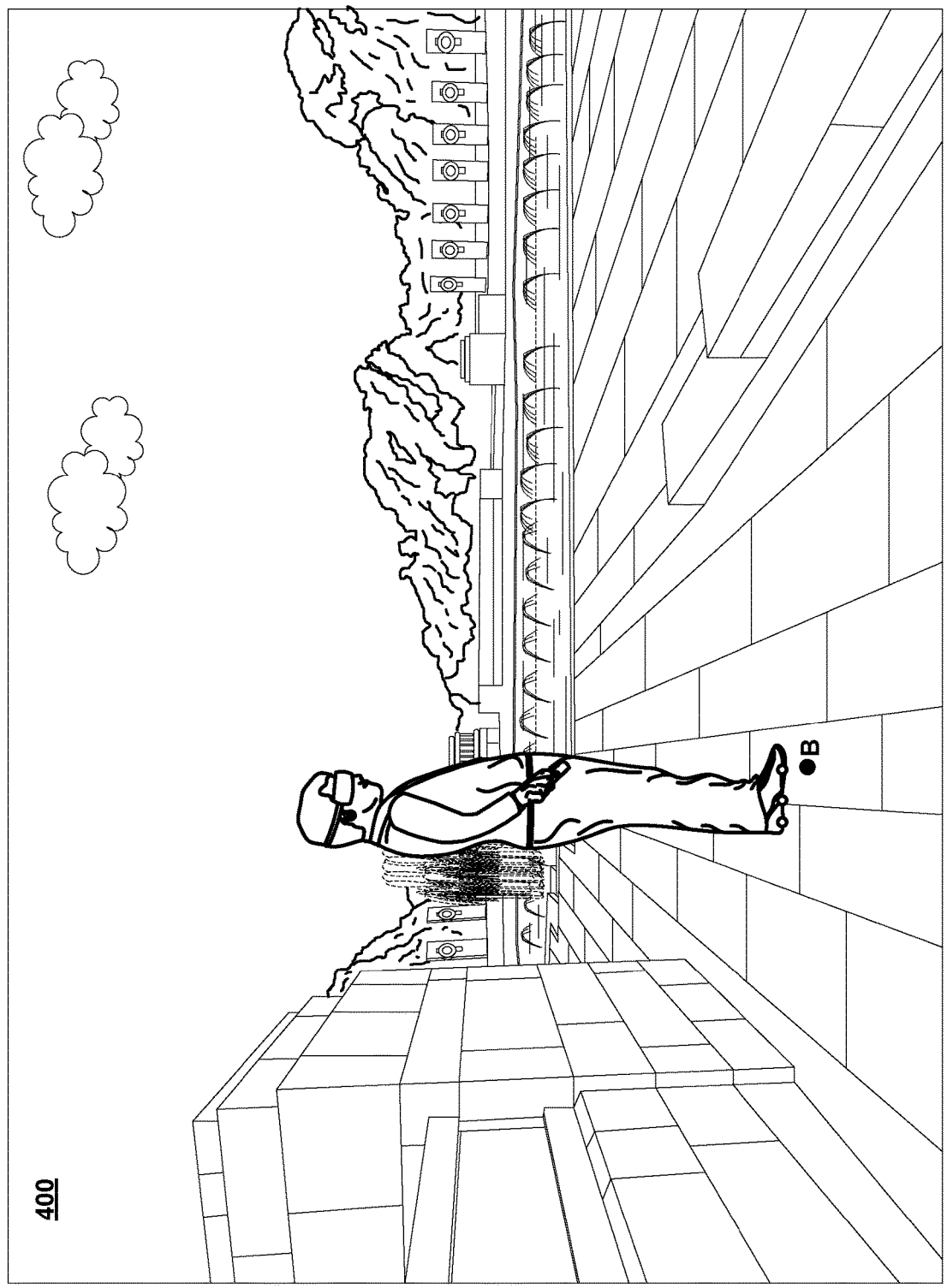

FIGS. 2A and 2B are third person views of a user, in a physical environment 300 (e.g., a room, physically bounded environment) wearing the example HMD 100 and the example motorized footwear 200 (shown in FIG. 1). In this example, the user is immersed in a virtual reality environment in which the virtual environment is only to the user, within the confines of the HMD 100, and not to others, outside of the HMD 100. However, in the example third person view shown in FIGS. 2A-2B, an example three-dimensional virtual scene 400 displayed to the user, for example on a display device of the HMD 100, is illustrated outside of the HMD 100, simply for ease of discussion and illustration. Further, the principles to be described herein may also be applied to an augmented reality environment, or mixed reality environment, in which the physical environment is, for example, at least partially visible to the user.

When presented with the virtual scene 400, the user may wish to virtually move within the virtual scene 400, for example from a first virtual position A toward a second virtual positon B. The user may move from the first virtual position A toward the second virtual positon B, to, for example, engage in a virtual game, interact with other users sharing the virtual space, interact with and/or manipulate virtual features in the virtual scene 400, and the like. In some implementations, such a movement may be accomplished by, for example zooming in a particular direction and/or toward a particular virtual feature, teleporting to or near a particular virtual feature, and/or the like. However, in some implementations, it may enhance the user's immersive experience in the virtual environment if the user can experience the sensation of physically moving, or physically walking, with the user's physical movement correlated into virtual movement in the virtual scene 400. In the example shown in FIGS. 2A-2B, this may involve moving, for example, walking, from a virtual position A, along the virtual walkway toward a virtual positon B, to explore virtual features in the virtual distance of the virtual scene 400. However, in some situations, the user's ability to continue to physically move, or walk, in the physical environment 300 may be limited by, for example, the physical boundaries of the physical environment 300, including, for example physical obstacles such as furniture and/or the like present in the physical environment 300, physical tethering to a support structure and/or physical tethering or connection to a computing system, and other such limitations to uninhibited movement.

In a system and method, in accordance with implementations described herein, a position of the motorized footwear 200 worn by the user may be tracked while the user is immersed in the virtual environment 400. The motorized footwear 200 may be selectively operated, based on the tracking, to maintain a physical position of the user within a physical operational zone 350 in the physical environment 300 (see FIGS. 3A-3C). For example, in some implementations, as the system detects a position of the motorized footwear 200 at or near a previously defined boundary of the physical operation zone 350, the system may operate the motorized footwear 200 to move (e.g., or propel) the user back into the physical operational zone 350. In some implementations, the physical operational zone 350 may be a previously defined physical area in the physical environment 300. The physical operational zone 350 may be a physical area that is free of physical obstacles, boundaries and the like that would otherwise inhibit the user's physical movement in the physical environment 300. Operation of the motorized footwear 200 in this manner may compensate for the user's physical movement, moving the user back into the physical operational zone 350. This may allow the user to continue to experience physical motion in the physical environment 300, as the user is moved back into the physical operational zone 350. This continued physical motion may provide for seemingly endless movement in the virtual environment 400. This may generate a heightened sense of presence in the virtual environment 400, and/or enhance the user's experience in the virtual environment 400, while providing for safe operation of the virtual reality system in the physical environment 300.

Figure 3A:
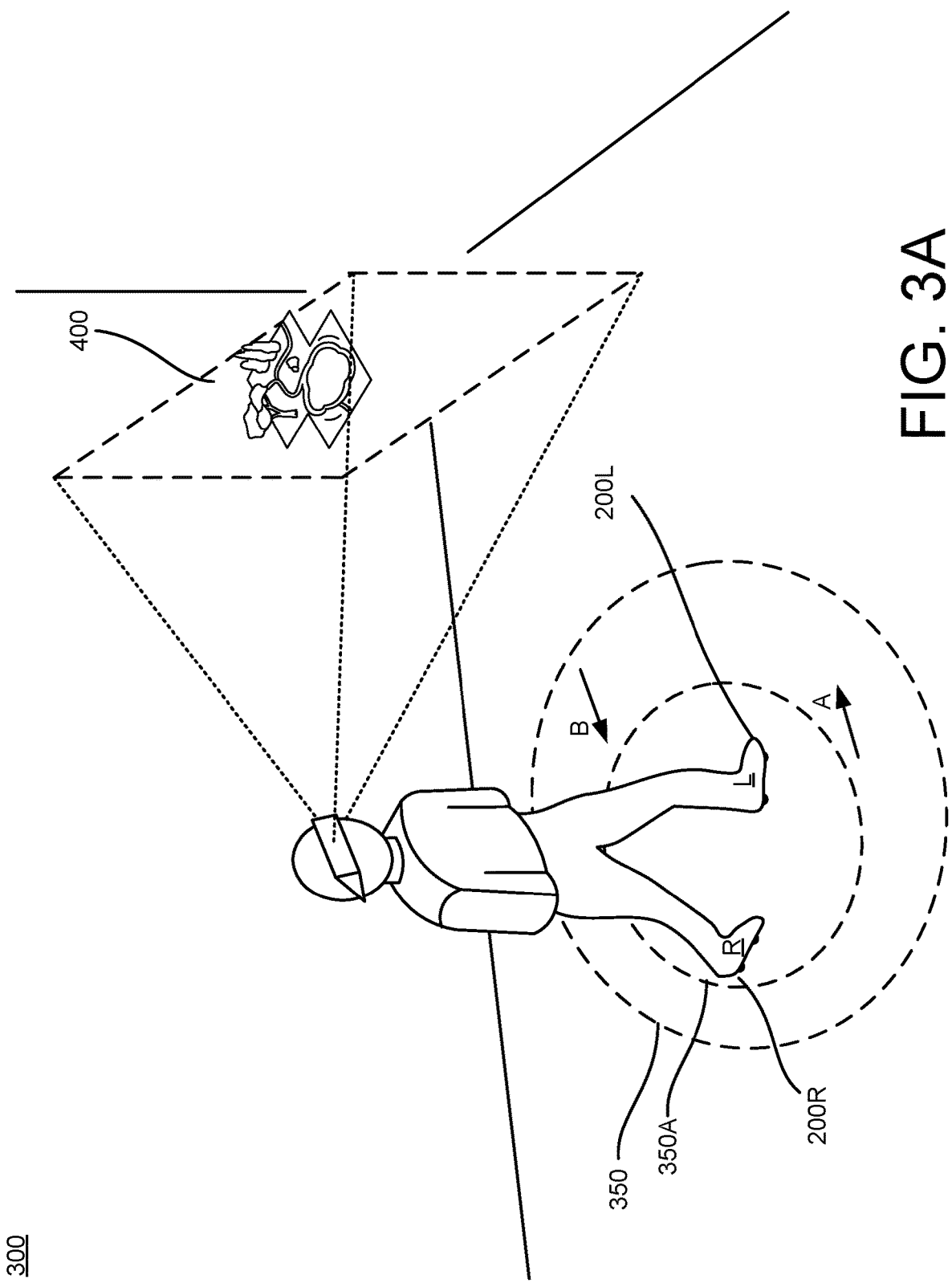
FIGS. 3A-3C illustrate operation of an example augmented and/or virtual reality system, in accordance with implementations described herein.
Figure 3B:
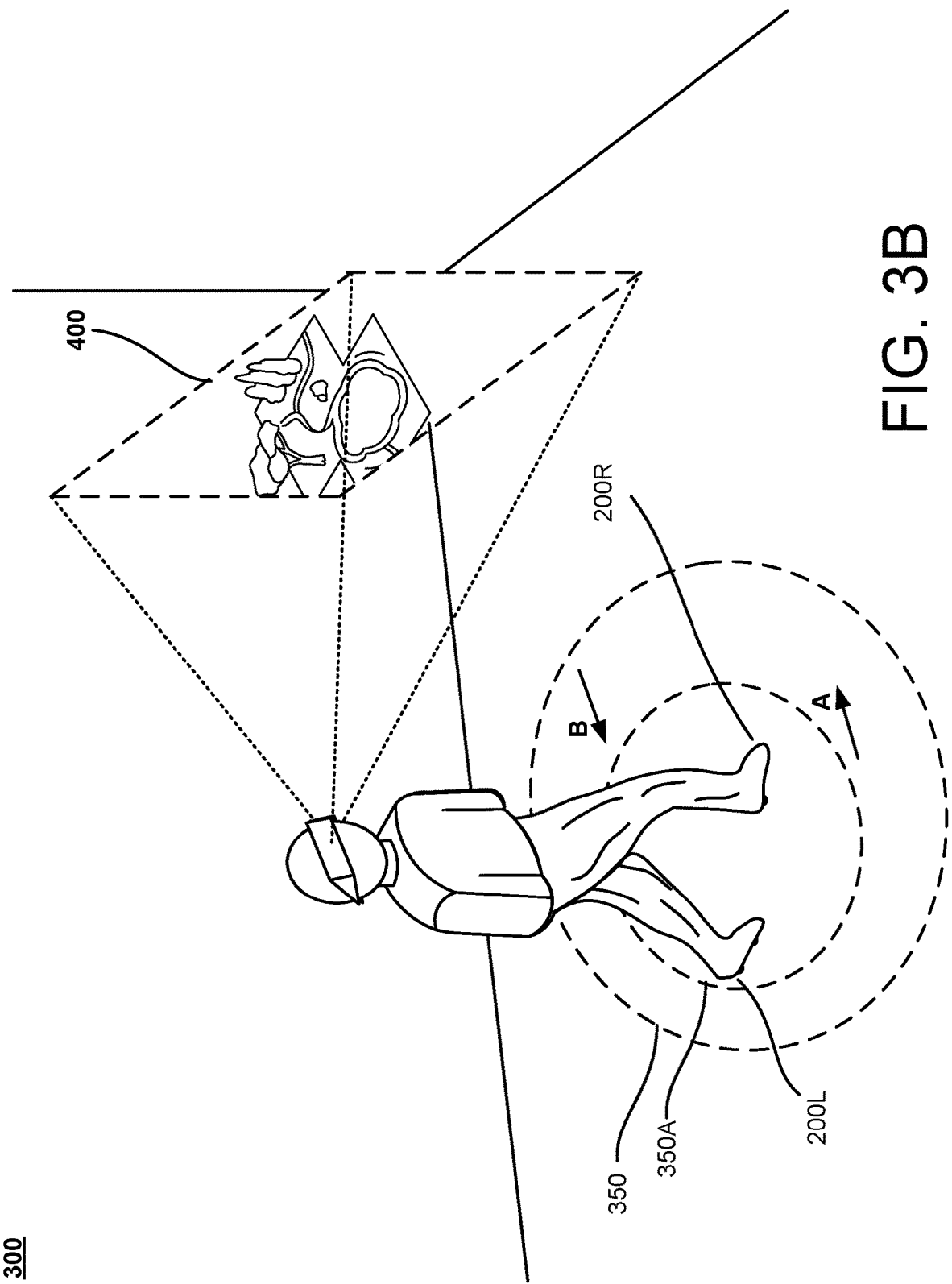
Figure 3C:
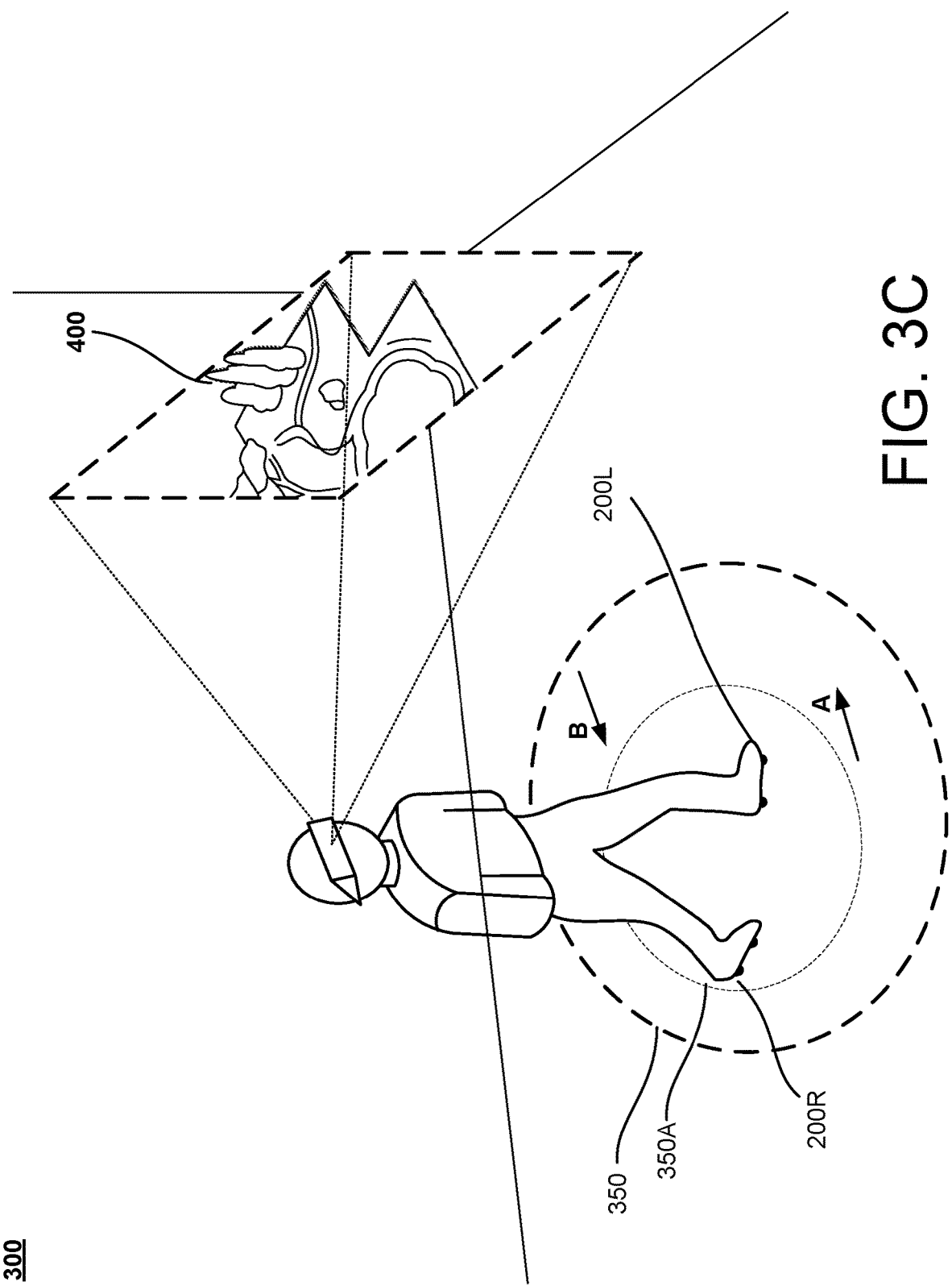

FIGS. 3A-3C illustrate an example implementation, including a third person view of a user in the physical environment 300 (e.g., a room 300) wearing the HMD 100 and the motorized footwear 200, while experiencing the virtual environment 400. The virtual environment 400 may be displayed to the user, for example, on a display included in the HMD 100. In the example third person view shown in FIGS. 3A-3C, a virtual scene of the virtual environment 400 displayed to the user is illustrated outside of the HMD 100, simply for ease of discussion and illustration.

As shown in FIGS. 3A-3C, the physical operational zone 350 may be a previously defined physical area in the physical environment 300 that is relatively free from physical obstacles. In the example shown in FIGS. 3A-3C, the physical operational zone 350 is substantially circular, simply for ease of discussion and illustration. The physical operational zone 350 may have other contours and/or shapes (e.g., square, rectangular, oval, etc.), based on available space, tracking area/range for the motorized footwear 200, user preferences, and other such factors.

As noted above, when viewing the virtual scene 400, the user may choose to explore virtual features in the virtual distance by moving relative to the virtual features. In some implementations, this may be accomplished by physically moving, or walking, in the physical environment 300, with the detected physical movement of the user translated into corresponding virtual movement in the virtual environment 400. In this example, the user is wearing a first motorized shoe 200L on a left foot, and a second motorized shoe 200R on a right foot. The physical position and physical movement of the first and second motorized shoes 200L, 200R may be tracked by a tracking device that is operably coupled in the virtual reality system. As the feet of the user move, for example, in a walking motion, the tracked movement of the first and second motorized shoes 200L, 200R may cause corresponding movement in the virtual environment 400, providing for a connection between the physical and virtual environments, and providing the user a sense of presence in the virtual environment 400.

The physical walking movement illustrated in FIGS. 3A-3C, in the forward direction, illustrated by the arrow A in FIGS. 3A-3C, would typically cause the user to continue to move physically forward in the physical environment 300. Continued physical movement, for example, in the forward direction of arrow A, while immersed in the virtual environment 400 may cause the user to collide with a physical wall, or other physical obstacle(s) in the physical environment 300. In an augmented reality and/or a virtual reality system, in accordance with implementations as described herein, the system may track the user's movement in the physical environment 300, and in particular, a physical position of the first and second motorized shoes 200L, 200R in the physical environment 300. In response to detection by the system that one, or both, of the motorized shoes 200L, 200R, are at or near a boundary of the previously defined physical operation zone 350, the system may operate, or actuate, motors in one, or both, of the motorized shoes 200L, 200R. Actuation of the motor(s) of one, or both, of the motorized shoes 200L, 200R, may cause the motorized shoes 200L, 200R to move the user back into a return zone 350A associated with the operational zone 350. The return zone 350A may be, for example, a designated (e.g., predefined, target) portion (e.g., central portion) of the physical operational zone 350. In some implementations, the return zone 350A may represent an area or portion of the operational zone 350 to which the user may be returned so as to take the most advantage of unobstructed forward movement.

In some implementations, actuation of the motor(s) of the motorized shoes 200L, 200R, may actuate wheels, rollers, tracks, balls, and the like, coupled the soles of the motorized shoes 200L, 200R, in contact with the floor surface of the physical environment 300, moving the user in a desired direction. For example, actuation of the motor(s) of one, or both, of the motorized shoes 200L, 200R, may cause the motorized shoes 200L, 200R to move the user in a rearward direction illustrated by the arrow B, back into the physical operational zone 350 as the user's foot returns to the floor in a forward stride. By substantially continuously tracking the physical position of the motorized shoes 200L, 200R, and selectively operating the motor(s) of the motorized shoes 200L, 200R based on the detected physical positon, a physical position of the user may be maintained within the physical operational zone 350. This may allow the user to continue to virtually move, seemingly endlessly, in the virtual environment 400, while remaining in a set portion (i.e., the physical operational zone 350) of the physical environment 300.

For example, the user immersed in the virtual environment 400 may move in a forward walking motion, or forward stride, to experience forward virtual movement of the virtual environment 400. For example, the user may move his left foot L in the forward direction A, as shown in FIG. 3A, and then move his right foot R in the forward direction A, as shown in FIG. B, and then move his left foot L in the forward direction A as shown in FIG. 3C. This physical walking motion may cause the user to move virtually closer to particular virtual feature(s) in the virtual environment. However, as the user implements this physical walking motion in the forward direction A, the system may detect, for example, during one of the example strides illustrated, that one, or both, of the motorized shoes 200L, 200R is at or near a boundary of the previously defined operating zone 350. In response to this detection, the system may actuate one or more motors, of one, or both, of the motorized shoes 200L, 200R. Actuation of the motor(s) may cause wheels, rollers, tracks, balls, rods or the like, coupled to the soles of the motorized shoes 200L, 200R to operate. Power from the motor(s) may, for example, cause the wheel(s) to turn in a direction that conveys the user back into the operational zone 350, for example, toward a target portion, for example, a central portion of the operational zone 350.

Tracking of a physical position and/or physical movement of each of the motorized shoes 200L, 200R (for example, relative to the boundaries of the physical operational zone 350/return zone 350A) may be taken into account in determining operational factors of the motorized shoes 200. For example, this tracking information may be taken into account in determining an amount of power to be supplied from a motor to a locomotion device of each of the shoes 200, a particular point at which to supply power to each of the respective motorized shoes 200, a point at which to suspend the supply of power to each of the respective motorized shoes 200, and other such operational factors. In some implementations, proper timing of a point at which the supply of power to the locomotion device is initiated (or the point at which the locomotion device is actuated), and the point at which the supply of power to the locomotion device is suspended (or the point at which the locomotion device is deactivated), may provide for a more natural, and consistent, return of the user to the return zone 350A/operational zone 350 under the power of the locomotion devices of the motorized shoes 200.

Figure 4A:
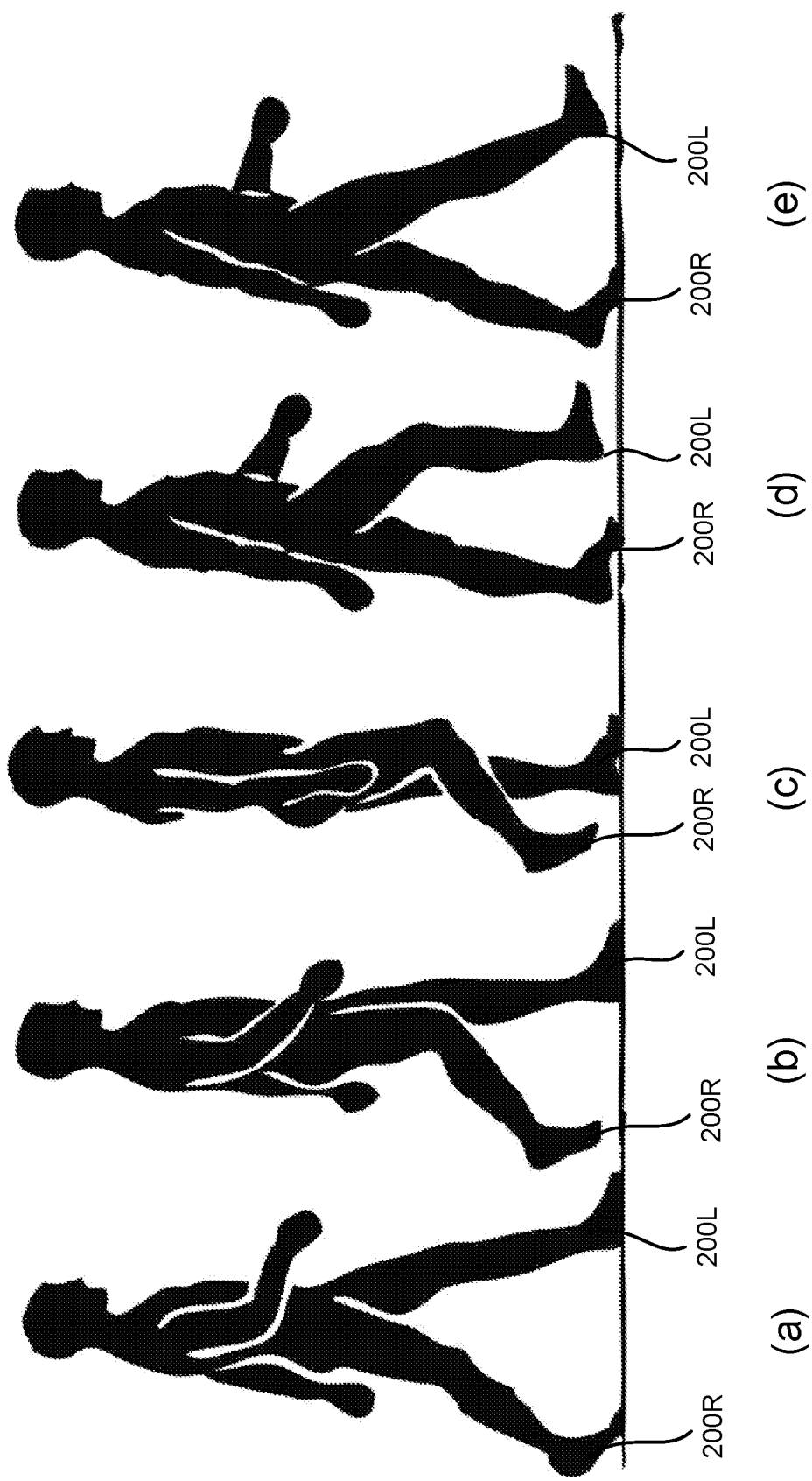

An exemplary stride, or gait, of an exemplary user, is shown in the exemplary sequence (a) through (e) illustrated in FIG. 4A. A transition between the portions of the stride shown in FIGS. 4A(c) through 4A(e) is illustrated in more detail in FIG. 4B. Known physical positions, physical movements, and physical trajectories of the left and right motorized shoes 200L, 200R (by, for example, a tracking module of a processing device of the motorized shoe 200) may trigger the application of power to locomotion devices of the motorized shoes 200 at detected points in the user's stride, and may trigger the suspension of power to the locomotion devices at detected points in the user's stride, to provide for a return of the user to the return zone 350A/operational zone 350 that is natural and consistent with the user's gait, and that will minimize instability related to the return of the user to the return zone 350A/operational zone 350.

For example, in some implementations, power may be applied to the locomotion device of each of the left and right motorized shoes 200L, 200R, to convey the user back into the operational zone 350, at a point at which the heel of the forward foot (the right foot of the user in the example shown in FIGS. 4A and 4B) makes contact the walking surface, as shown in FIG. 4A(e). At the point in the stride shown in FIG. 4A(e), the ball of the rear foot (the left foot of the user in this example) is still on the walking surface. In this arrangement, weight may be distributed substantially equally between the left foot and the right foot at this point in the user's stride. If the locomotion devices of both the left motorized shoe 200L and the right motorized shoe 200R are actuated at this point, the respective motors (powering the locomotion devices), and locomotion devices, will ramp up at approximately the same rate. This substantially equal loading (i.e., weight) on the left motorized shoe 220L and the right motorized shoe 200R, and the substantially equal, simultaneous ramp up of the respective locomotion devices, may provide for substantially stable movement of the shoes 200L, 200R, and substantially stable conveyance of the user back into the return zone 350A/operational zone 350.

In some implementations, the operation of the locomotion device of the motorized shoe 200 may be maintained until the motorized shoe 200 is detected within the return zone 350A. In some implementations, the operation of the motor 240 may be maintained for a set amount of time (for example, an estimated/calculated amount of time for the motorized shoe 200 to return from a current physical position back into the return zone 350A, based on physical characteristics of the locomotion device).

In some implementations, the tracking of the physical movement, and physical trajectory of each of the motorized shoes 200L, 200R may allow the system to predict, or anticipate, when the user will continue to walk forward, and when the user is about to stop walking. For example, the system may interpret the detection of a (larger) trajectory A as an indication that the user may continue to walk forward. The system may use this indicator to determine a point at which the locomotion device of the motorized shoe 200 (for example, the locomotion device of the particular motorized shoe 200 that is about to make contact with the walking surface, as described above with respect to FIG. 4A(e)) may be actuated. Similarly, the system may interpret the detection of a (smaller) trajectory B as an indication that the user may, for example, place the forward foot closer to the rear foot, and stop walking. The system may use this indicator to determine a point at which operation of the locomotion device of the motorized shoe 200 (for example, the motorized shoe 200 that is just leaving the walking surface, as in FIG. 4A(a)) may be suspended. In some implementations, the locomotion devices of the motorized shoes 200L, 200R may remain in an actuated state, to substantially continuously convey the user back to the return zone 350A/operational zone 350, until the system determines, based on these indicators, that the user will stop walking. This may be determined based on, for example, a physical size and/or shape of the operational zone 350, a speed at which the user is physically moving, a speed at which the locomotion devices are capable of conveying the user back into the return zone 350A/operational zone 350, and other such factors.

Figure 5A:
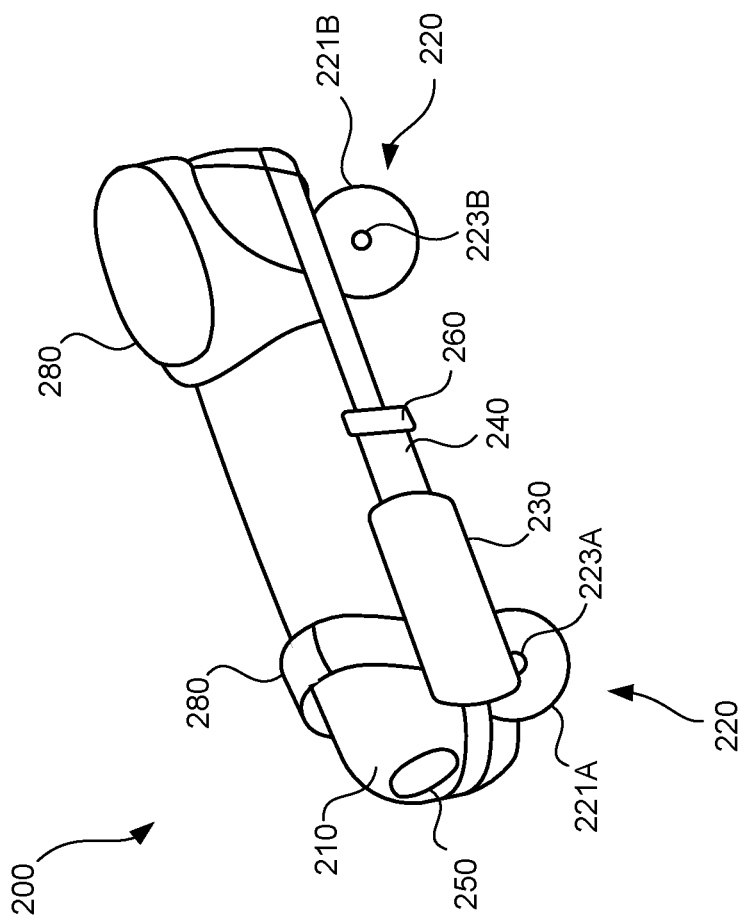
FIGS. 5A-5C illustrate an example motorized footwear component of an example augmented and/or virtual reality system, in accordance with implementations described herein.
Figure 5C:
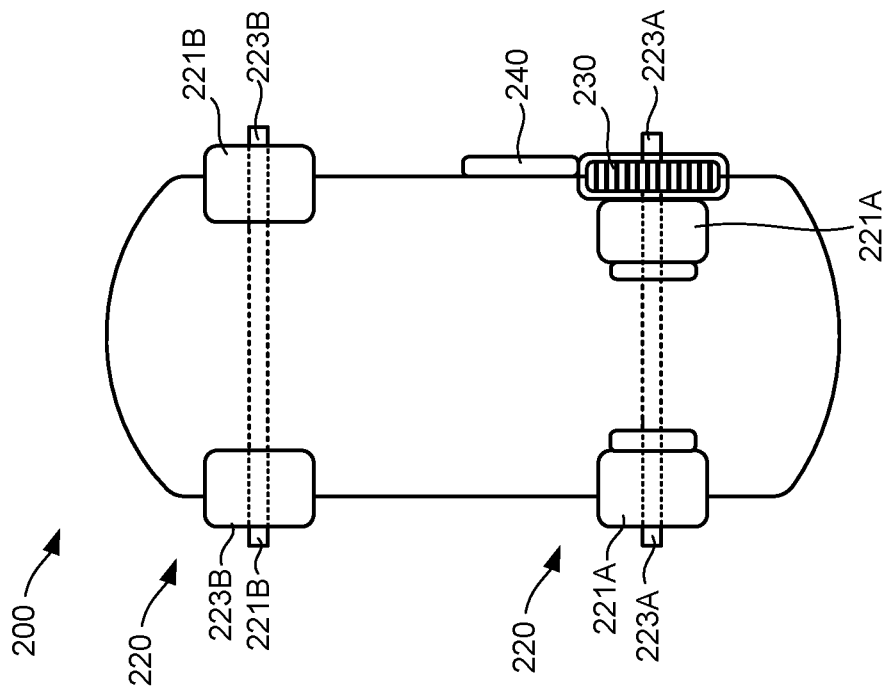
Figure 5B:
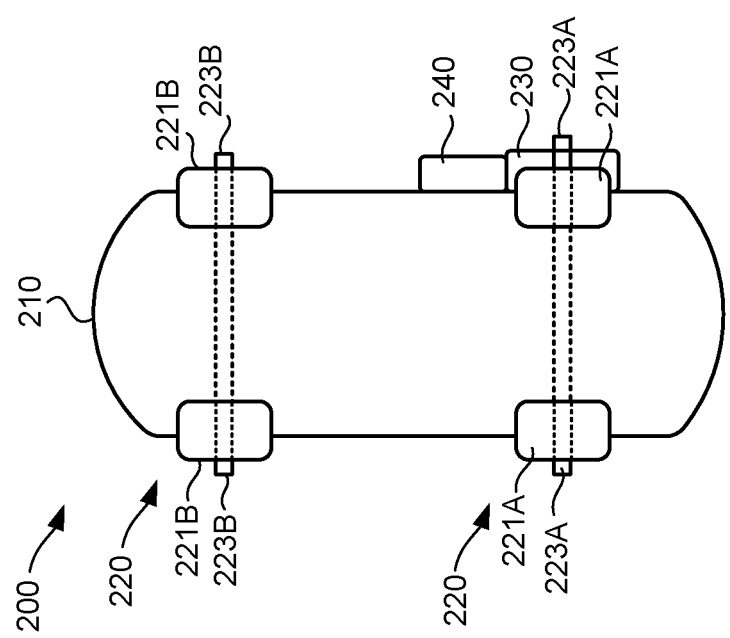

FIGs. are schematic illustrations of an exemplary motorized shoe 200, including a perspective view shown in FIG. 5A, a top view shown in FIG. 5B, and a bottom view shown in FIG. 5C. As discussed above, a first motorized shoe 200L may be worn on the left foot L of the user, and a second motorized shoe 200R may be worn on the right foot R of the user. Hereinafter, a single motorized shoe 200 will be described, simply for ease of discussion and illustration. However, the features to be described with respect to the single motorized shoe 200 may be applied to the left motorized shoe 200L, and also to the right motorized shoe 200R.

The exemplary motorized shoe 200 shown in FIGS. 5A-5C includes a platform 210 on which the foot of the user may be positioned. The motorized shoe 200 may be attached to the foot of the user by attachment devices 280 (see FIG. 5A; not illustrated in the top view shown in FIG. 5B). The attachment devices 280 may be adjustable, to accommodate different sizes of feet of different users, different types of shoes worn by the user(s), different user preferences for tightness, and the like. In the example shoe 200 shown in FIG. 5A, the attachment device 280 includes a first adjustable attachment device 280 at a front portion of the platform 210, and a second adjustable attachment device 280 at a rear portion of the platform 210. However, more, or fewer, attachment devices 280, in different locations and/or in different arrangements, may be used to secure the user's foot to the platform 210.

Figure 6C:
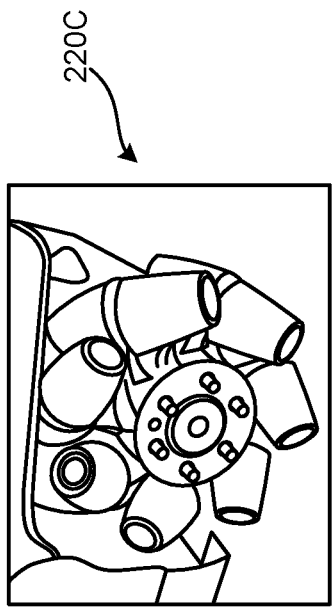
FIGS. 6A-6D illustrate example locomotion devices of the example motorized footwear component shown in FIGS. 5A-5C, in accordance with implementations described herein.
Figure 6D:
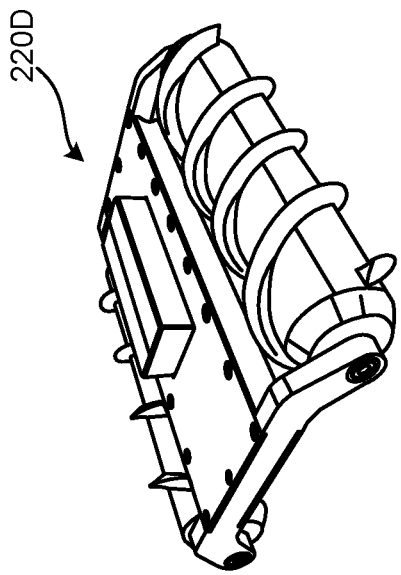
Figure 6A:
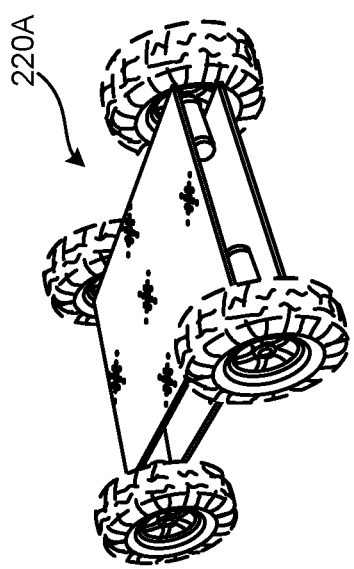
Figure 6B:
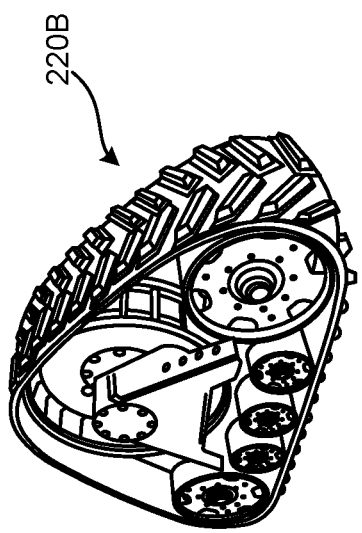

One, or more, locomotion devices 220 may be coupled to the platform 210. In the exemplary motorized shoe 200 shown in FIGS. 5A-5C, the locomotion device 220 includes a first set of wheels 221A mounted on a first shaft 223A, and a second set of wheels 221B mounted on a second shaft 223B, simply for ease of discussion and illustration. The locomotion device 220 may include other devices, to be discussed in detail hereinafter, which may be coupled to the platform 210 to convey and/or provide for locomotion of the motorized shoe 200. For example, in addition to the example wheel assembly shown in FIGS. 5A-5C (which is similar to the wheel assembly 220A shown in FIG. 6A), the locomotion device 220 may include a belt or track assembly 220B as in the example shown in FIG. 6B, an omnidirectional roller assembly 220C as in the example shown in FIG. 6C, a screw drive assembly 220D as in the example shown in FIG. 6D, and other such conveyance devices.

Figure 7C:
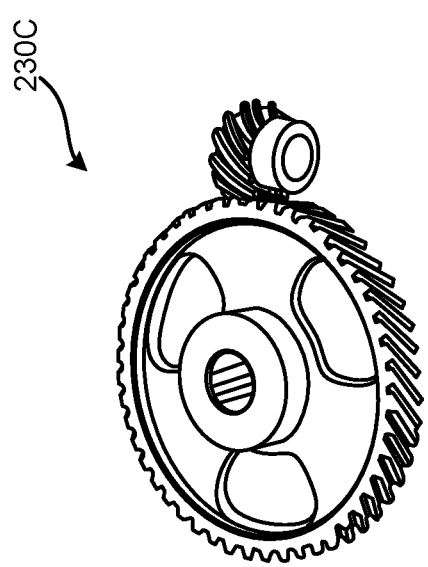
FIGS. 7A-7D illustrate example power transmission devices of the example motorized footwear component shown in FIGS. 5A-5C, in accordance with implementations described herein.
Figure 7D:
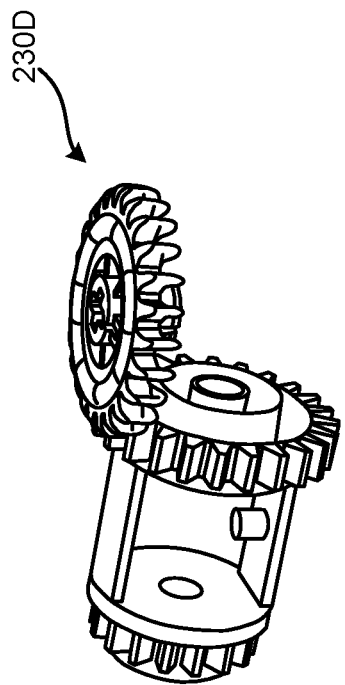
Figure 7A:
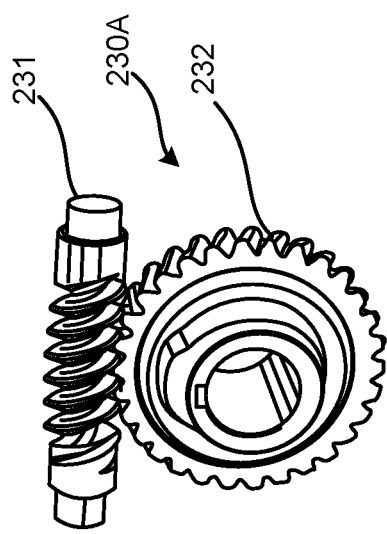
Figure 7B:
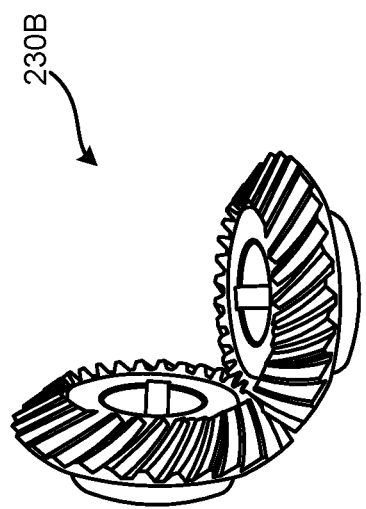

A motor 240 may provide a driving force for driving the locomotion device 220. A power supply 260 may supply power to the motor 240. A power transmission device 230 may transmit power generated by the motor 240 to the locomotion device 220, to drive the locomotion device 220. In the sample arrangement shown in FIGS. 5A-5C, the power transmission device 230 includes a worm gear 230A, or worm drive 230A, as also illustrated in FIG. 7A. The example worm gear 230A may provide for engagement between the motor 240 and the shaft 223 of one of the sets of wheels 221, to drive the wheels 221 and in turn propel the motorized shoe 200. In addition to the example worm gear 230A shown in FIGS. 5A-5C and 7A, the power transmission device 230 may include bevel gears 230B as in the example shown in FIG. 7B, helical gears 230C as in the example shown in FIG. 7C, crown gears 230D as in the example shown in FIG. 7D, and other such devices. In the example motorized shoe 200 shown in FIGS. 5A-5C, the power supply 260, the motor 240 and the power transmission device 230 are coupled to a lateral side of the platform 210, simply for ease of discussion and illustration. The power supply 260, the motor 240 and the power transmission device 230 may be coupled to the locomotion device 220 at a variety of different location(s), and/or in a variety of different manner(s).

In some implementations, a processing device 250 may be coupled to the motorized shoe 200. The processing device 250 may be in communication with a computing device operably coupled in the virtual reality system such as, for example, the HMD 100, or another external computing device. Data provided by the processing device 250, for example, from a tracking module of the processing device 250, may be used to determine when the shoe 200 is at, or near, a physical boundary of the previously defined physical operational zone 350. The processing device 250 coupled to the motorized shoe 200, including a tracking module, is just one example of how a physical position of the motorized shoe 200 in the physical environment may be tracked. In some implementations, a physical position of the motorized shoe 200 may be tracked by, for example, optical and/or image sensors in the physical environment, positional sensor(s) such as, for example, an inertial measurement unit, provided in the motorized shoe 200 that may communicate with the HMD 100 to determine a position and orientation of the motorized shoe 200 relative to the HMD 100, and the like.

In response to detection of the motorized shoe 200 at, or near, or approaching, a physical boundary of the operational zone 350, the system may transmit a signal to the processing device 250, causing the processing device 250 to actuate the motor 240 to supply power to the locomotion device 220. Operation of the locomotion device 220, for example, a turning of the wheels 221 of the example motorized shoe 200 shown in FIGS. 5A-5C, may convey the motorized shoe 200, and the user wearing the motorized shoe 200, back into a designated (e.g., a more central) portion of the operational zone 350, such as, for example, the return zone 350A described above. This re-positioning of the user into the operational zone 350 may allow the user substantially uninterrupted physical movement, or walking, in the physical environment 300, and corresponding substantially uninterrupted virtual movement in the virtual environment 400, as described above in more detail with respect to FIGS. 3A-3C.

In some implementations, an amount of power supplied from the motor 240 to the locomotion device 220 may affect, for example, a speed at which the wheels 221 of the motorized shoe 200 shown in FIGS. 5A-5C rotate (e.g., turn). An amount of power to be supplied by the motor 240 and/or a speed at which the locomotion device 220 is to operate may be determined based on, for example, a physical size of the operational zone 350, a physical distance the user is to be moved through the operation of the locomotion device 220, a physical speed/acceleration of the user's physical movement, characteristics of the physical environment 300 such as floor surface characteristics and/or the like, characteristics of the virtual environment 400 in which the user is immersed, a physical size/weight of the user, a user's experience level, and numerous other factors.

Continued tracking of the physical position of the motorized shoe 200 in the physical environment 300 may allow the system to detect if and/or when the motorized shoe 200 is in a desired return zone 350A within the operational zone 350. The desired return zone 350A may be an area within the operational zone 350 to which the motorized shoe 200 is set (e.g., pre-programmed) to return, to facilitate (e.g., optimize) the continued physical movement of the user within the boundaries of the operational zone 350. A size and/or shape of the return zone 350A may vary, based on, for example, a size of the operational zone 350, an amount and/or speed and/or acceleration of the user's physical movement, environmental characteristics of the physical environment 300 and/or the virtual environment 400, and/or numerous other factors. In some implementations, when it is detected that the motorized shoe 200 is in the return zone 350A, the system may pause, or temporarily suspend, operation of the motor 240 and/or subsequent power to the locomotion device 220. The system may resume operation of the motor 240 and/or power to the locomotion device 220 upon detection of the motorized shoe 200 once again at or near the boundary of the operational zone 350. As also noted above, the tracking of the physical position of the motorized shoe 200 may also be used to determine a particular point at which to apply power from the motor 240 to the locomotion device 220, and/or to suspend the supply of power to the motorized shoe 200. In some implementations, the operation of the motor 240 may be maintained until the motorized shoe 200 is detected within the return zone 350A. In some implementations, the operation of the motor 240 may be maintained for a set amount of time (for example, an estimated amount of time for the motorized shoe 200 to return from a current position back into the return zone, based on a rotational speed of the shaft 223 in combination with a diameter of the wheels 221 in the example shown in FIGS. 5A-5C). In some implementations, the locomotion device 220 of the motorized shoe 200 may operate substantially continuously, so as to substantially continuously convey the user back into the return zone 350A, based on numerous factors described in detail above.

In some implementations, the motor 240 may be a bi-directional motor. Use of a bi-directional motor may allow a direction of movement of the locomotion device 220 to vary, and the motor 240 to be selectively operated based on a current position of the motorized shoe 200 relative to the return zone 350A.

Figure 8:
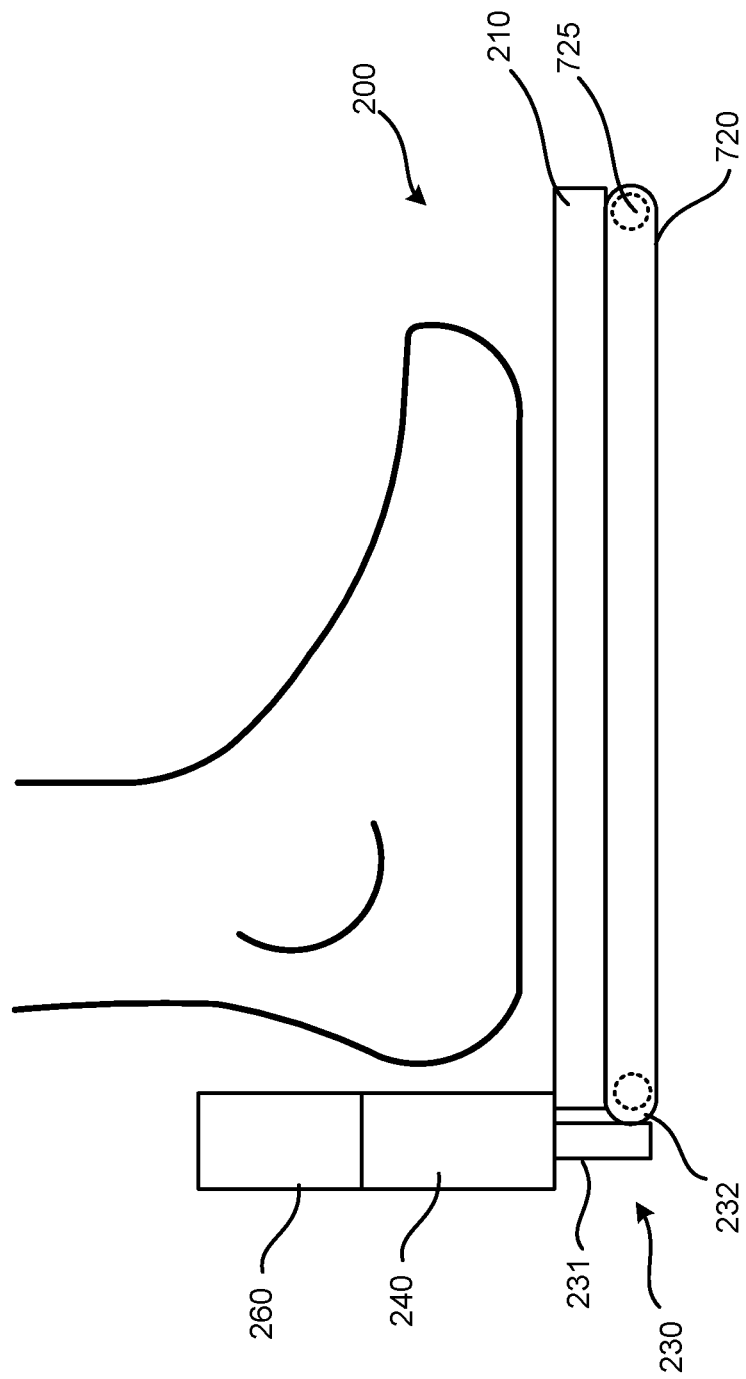
FIGS. 8-10 illustrate example motorized footwear components of an example augmented and/or virtual reality system, in accordance with implementations described herein.

As noted above, the power supply 260 and/or the motor 240 and/or the power transmission device 230 may be positioned at different locations relative to the locomotion device 220 and/or relative to the platform 210 of the motorized shoe 200. As also noted above, the motorized shoe 200 may include different types of power transmission device(s) 230 and/or different types of locomotion device(s) 220. For example, as shown in FIG. 8, in some implementations, the motor 240 and the power transmission device 230 may be positioned at a rear portion of the platform 210 of the motorized shoe 200, and the locomotion device 220 may include one or more belts 720 fitted on rollers 725. In the example shown in FIG. 8, the power transmission device 230 may include a worm gear 230A, or worm drive 230A (as shown in FIG. 7A). A worm shaft 231 of the worm 230A may be coupled to the motor 240, and may receive a rotational force from the motor 240 that rotates the worm shaft 231. The worm shaft 231 may mesh with the teeth of a worm wheel 232, such that the worm wheel 232 rotates in response to rotation of the worm shaft 231. The worm wheel 232 may be fitted on the roller 725 such that the roller 725 rotates in response to, and together with, the worm wheel 232, thus rotating the one or more belts 720, and causing the motorized shoe 200 to move in a corresponding direction. In some implementations, a locomotion device 220 including belt(s) 720, as in the example shown in FIG. 8, may provide the user with enhanced stability, due to a greater contact area between the belt(s) 720 and the floor surface of the physical environment 300.

Figure 9:
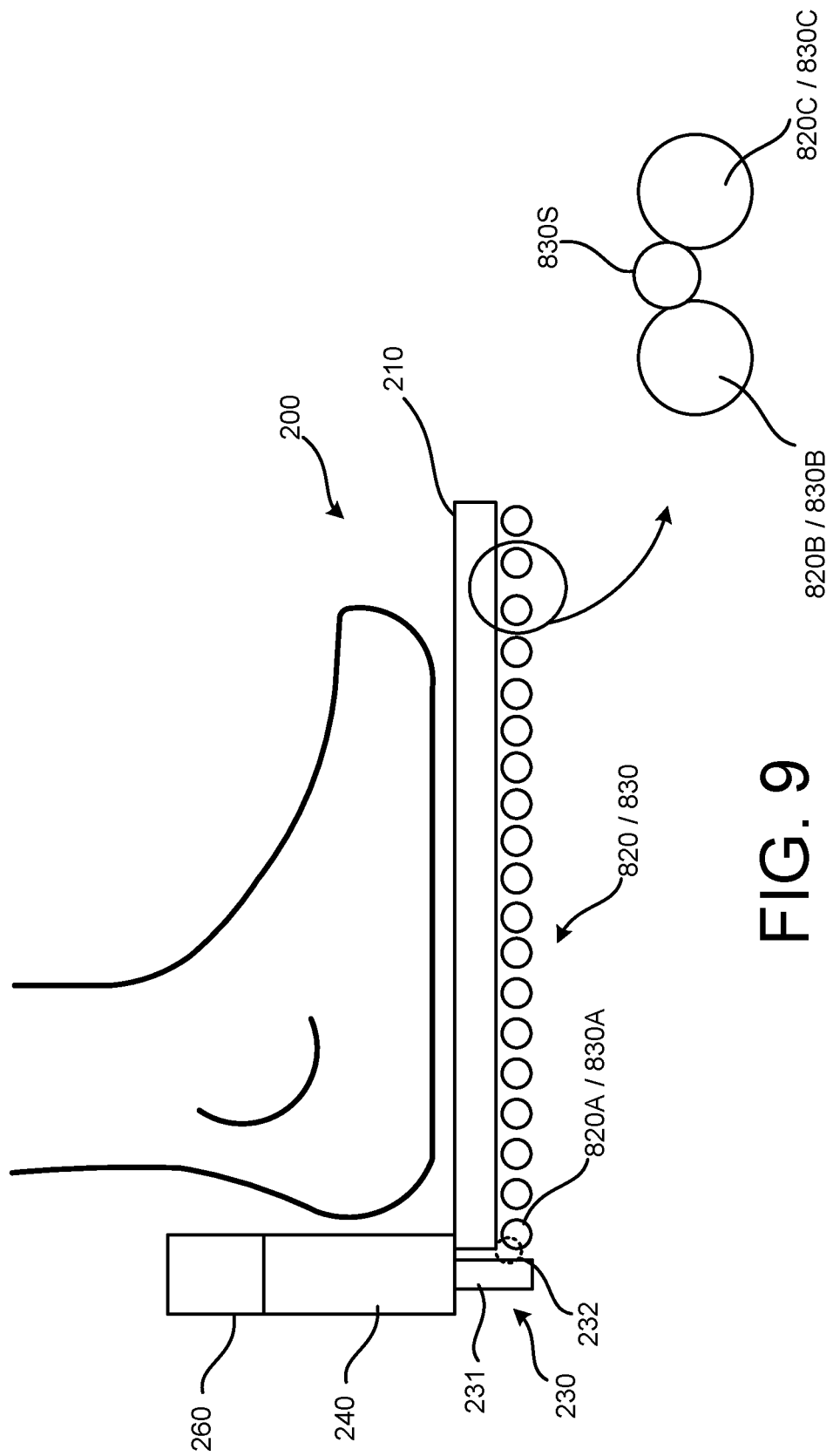

Another example implementation is illustrated in FIG. 9. As shown in this example, the motor 240 and the power transmission device 230 may be positioned at a rear portion of the platform 210 of the motorized shoe 200. The power transmission device 230 may include a worm gear 230A, or worm drive 230A (as shown in FIG. 7A). In this example, the locomotion device 220 may include a plurality of wheels 820, or rollers 820, and a plurality of meshed gears 830. For example, a combination spur/helical gear 830 may be combined with a wheel 820, or roller 820, on the same axle. The worm gear 230 may engage the motor 240 and one of the plurality of meshed gears 820A. Power may be transmitted from the motor 240 to the first gear 830A by the worm shaft 231 and worm wheel 232, causing the first wheel 820A to rotate. Meshing amongst the plurality of gears 830 may cause all of the plurality of wheels 820, respectively arranged on the plurality of axles, to rotate in response to rotation of the first gear 830A and first wheel 820A, and the motorized shoe 200 to move in a corresponding direction. In this example arrangement, a first gear 830B may mesh with a smaller gear 830S, and the smaller gear 830S may mesh with the next gear 830C, and so on, along the bottom portion of the platform 210. As these smaller gears 830 mesh, the gears 820 rotate, and the wheels 820 mounted on the same axles, also rotate. The use of multiple, smaller meshed gears 830 and wheels 820 in this manner may allow for transmission of power to the locomotion device 220 for movement of the shoe 200 without the use of a drive belt. This arrangement may keep the wheels 820 moving in the same direction, and provide for more precise control of movement of the motorized shoe 200.

Figure 10:
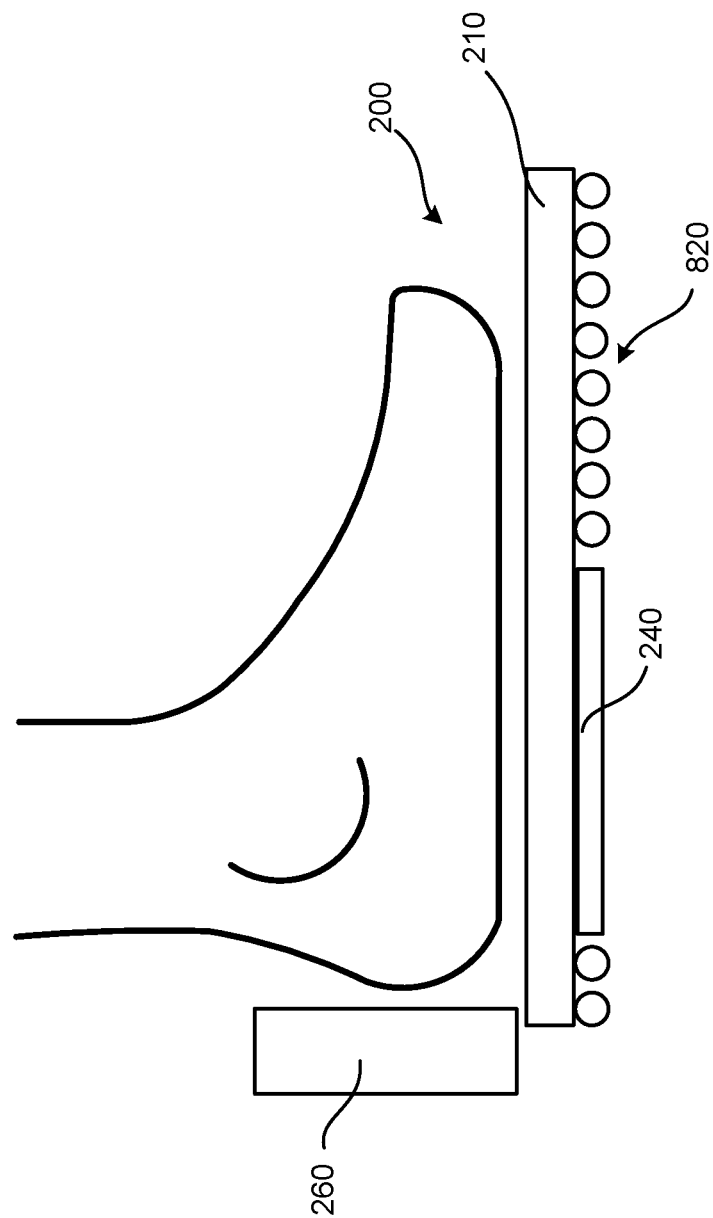

Another example implementation is illustrated in FIG. 10. As shown in this example, the motor 240 and the power transmission device 230 may be positioned on a bottom surface of the platform 210 of the motorized shoe 200, with the power supply 260 positioned at the rear portion of the platform 210. In this arrangement, the motor 240 may be a pancake motor. A pancake motor may have a relatively compact form factor, allowing the mechanisms to fit within the profile of the platform 210. The size of the motor 240 in this arrangement may allow for the use of a direct drive power transmission device 230, and/or may accommodate a planetary or harmonic drive system to provide additional torque.

Figure 12B:
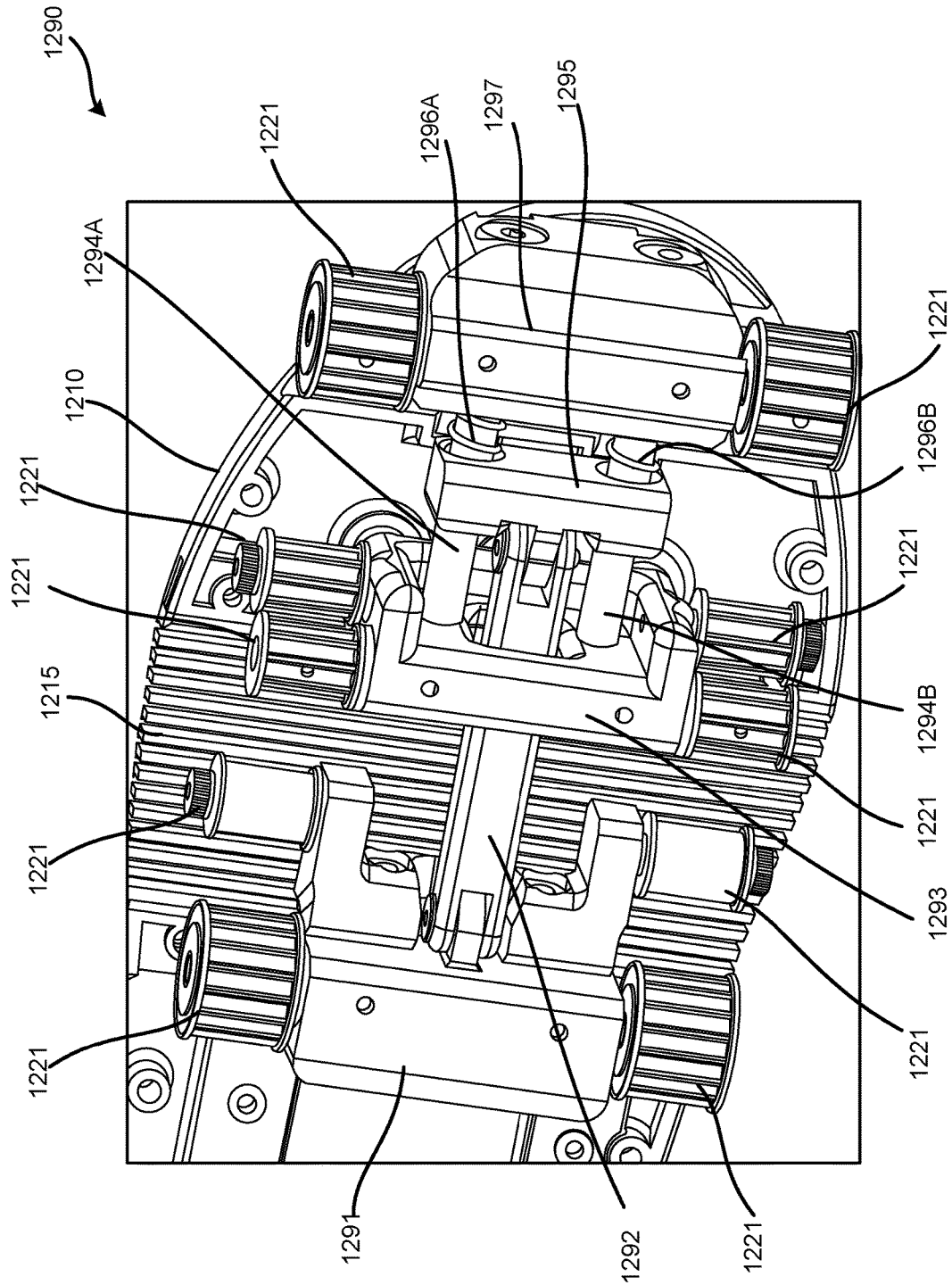
Figure 12C:
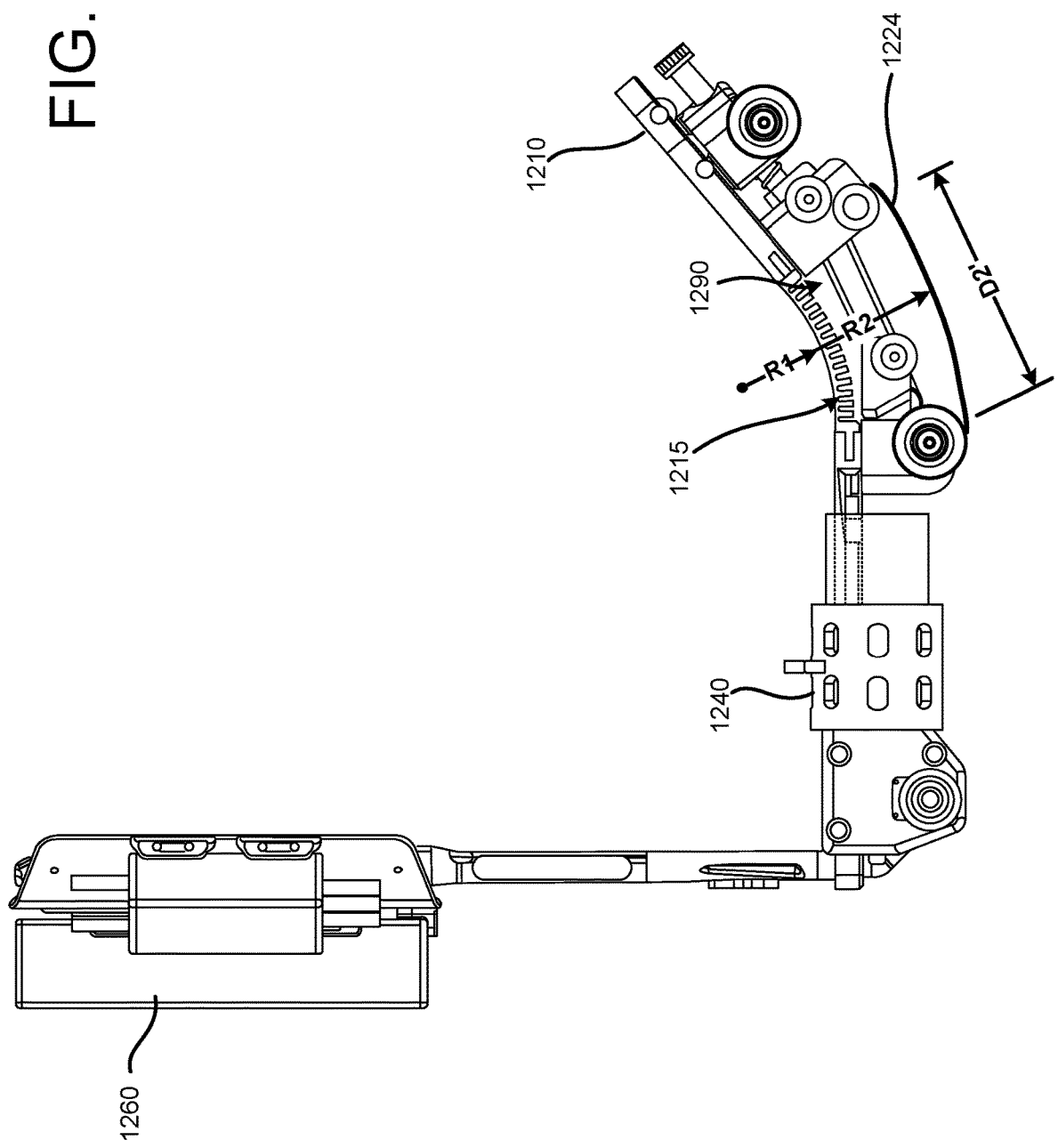
Figure 12D:
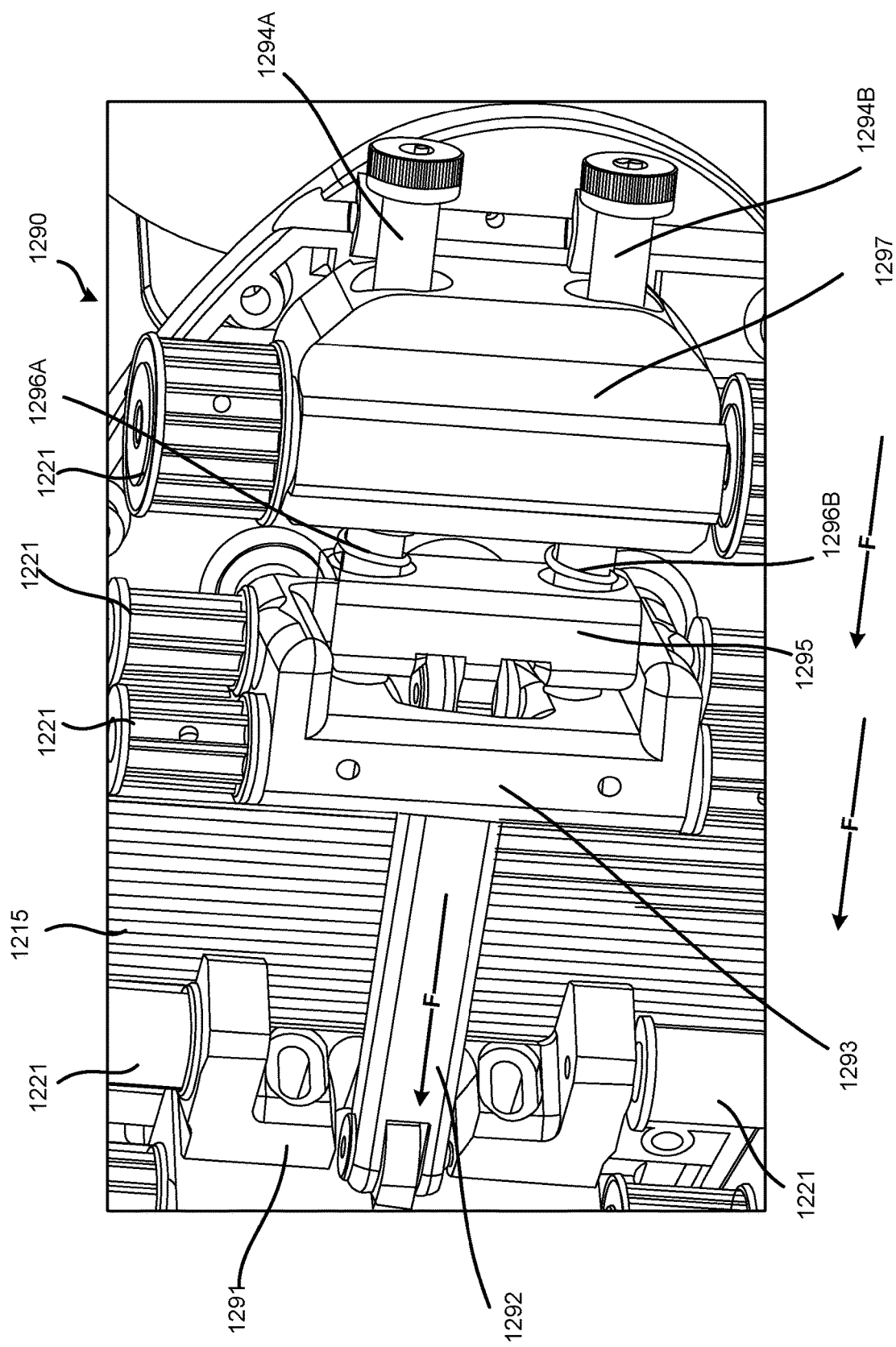

FIGS. 11 and 12A-12D illustrate an exemplary motorized shoe assembly 1200, in accordance with implementations described herein. In particular, FIG. 11 is a side view of the motorized shoe assembly 1200. FIGS. 12A and 12C are partial side views of the motorized shoe assembly 1200, and FIGS. 12B and 11D are partial bottom views of a platform portion of the motorized shoe assembly 1200, with FIGS. 12A and 12B illustrating a neutral, or un-flexed, state of the motorized shoe assembly 1200, and FIGS. 12C and 12D illustrating a flexed state, for example, a fully flexed state, of the motorized shoe assembly 1200.

As discussed above, a first motorized shoe assembly 1200 may be worn on the left foot L of the user, and a second motorized shoe assembly 1200 may be worn on the right foot R of the user. Hereinafter, a single motorized shoe assembly 1200 will be described, simply for ease of discussion and illustration. However, the features to be described with respect to the single motorized shoe assembly 1200 may be applied to the left motorized shoe assembly, and also to the right motorized shoe assembly.

The exemplary motorized shoe assembly 1200 may include a platform 1210 on which the foot of the user may be positioned. One, or more, locomotion devices 1220 may be coupled to the platform 1210. A motor 1240 may provide a driving force for driving the locomotion device 1220. A power supply 1260 may supply power to the motor 1240, for operation of the locomotion device 1220. A power transmission device 1230 may transmit power generated by the motor 1240 to the locomotion device 1220, to drive the locomotion device 1220. One or more attachment devices 1280 may secure the motorized shoe assembly 1200 to the user. The attachment devices 1280 may be adjustable, to accommodate different users, different types of shoes worn by the user(s), different user preferences for tightness, and the like. In the example shown in FIGS. 11 and 12A-12D, a first adjustable attachment device 1280A may secure a front portion of the user's foot to the platform 1210, and a second adjustable attachment device 1280B may secure the power supply 1260 and transmission device 1230 to, for example, a calf/shin of the user. Securing of the power supply 1260 to the shin/calf of the user may reduce a weight of the components coupled to the platform 1210 (when compared to an arrangement in which the motor is secured to the platform, as in the previous examples). The distribution of weight of the motorized shoe assembly 1200, and the reduced amount of weight carried by, or coupled to, the platform 1210, may provide for more natural, agile user movement and improved stability.

In some implementations, a processing device 1250 may be in communication with a computing device operably coupled in the virtual reality system such as, for example, the HMD 100, or another external computing device. Data provided by the processing device 1250, for example, from a tracking module of the processing device 1250, may be used to determine when the motorized shoe assembly 1200 is at, or near, a physical boundary of the previously defined physical operational zone 350. In the example motorized shoe assembly 1200 shown in 11 and 12A-12D, the processing device 1250 is coupled to the platform 1210, simply for ease of discussion and illustration. However, the processing device 1250 may be provided at other locations on the motorized shoe assembly 1200. The processing device 1250 including a tracking module is just one example of how a physical position of the motorized shoe assembly 1200 in the physical environment may be tracked. In some implementations, a physical position of the motorized shoe assembly 1200 may be tracked by, for example, optical and/or image sensors in the physical environment, positional sensor(s) such as, for example, an inertial measurement unit, provided in the motorized shoe assembly 1200 that may communicate with the HMD 100 to determine a position and orientation of the motorized shoe assembly 1200 relative to the HMD 100, and the like.

In the exemplary motorized shoe assembly 1200 shown in FIGS. 11 and 12A-12D, the locomotion device 1220 includes at least one belt 1224 mounted on a plurality of wheels 1221. The example arrangement shown in FIGS. 11 and 12A-12D includes a first plurality of wheels 1221A through 1221J, arranged on a first side of the platform 1210 to guide movement of a first belt 1224, with a second plurality of wheels 1221 arranged in a similar, or symmetrical, manner on a second side of the platform 1210 to guide movement of a second belt 1224. The motorized shoe assembly 1200, in accordance with implementations described herein, may include more, or fewer, wheels arranged in the same, or a similar, or a different manner than illustrated. Each of the wheels 1221 may be mounted on a corresponding shaft 1223, such that each wheel 1221A-1222J is rotatable about its respective shaft 1223A-1223J. In some implementations, the motor 1240 may drive one of the wheels 1221 coupled to the belt 1224, with the remaining wheels 1221 guiding the movement of the belt 1224. For example, the motor 1240 may drive the wheel 1221A, such that the wheel 1221A rotates, causing rotation of the belt 1224 coupled to the wheel 1221A. The remaining wheels 1221B through 1221J may also rotate due to their respective contact with the moving belt 1224, thus guiding the uniform movement of the belt 1224. In this type of arrangement, one wheel 1221, for example, the wheel 1221A, may be considered the driving wheel, while the remaining wheels 1221B-1221J may be considered driven wheels. In some implementations, the motor 1240 may be coupled to the locomotion device 1220 so as to drive a different one of the plurality of wheels 1221, or multiple wheels of the plurality of wheels 1221.

FIGS. 12A and 12B illustrate the platform 1210 in the neutral, or un-flexed state. FIGS. 12C and 12D illustrate the platform 1210 in the flexed state. The platform 1210 may include a flex region 1215, to allow for flexing, or bending, of the platform 1210 in a portion of the platform 1210 corresponding to the ball of the foot of the user. In the example shown in FIGS. 11 and 12A-12D, the flex region 1215 is defined along a bottom surface portion of the platform 1210, as a series of ridges or corrugations along the bottom surface of the platform 1210 to allow for being of the platform 1210. The flex region 1215 may allow the platform 1210 to bend, or flex, with the natural flexing of the user's foot as the user walks. The bending/flexing of the platform 1210 provided by the flex region 1215 may allow the platform 1210 to conform to the natural flexing or bending of the user's foot as the user walks, thus providing the user a more natural virtual immersive experience. As the platform 1210 flexes in the flex region 1215, tension on the belt 1224 may vary, depending on the degree of flex in a particular stride. For example, as shown in FIG. 12A, in the neutral position, a distance D1, from a first end of the flex region 1215 to a second end of the flex region 1215, is substantially linear, and is substantially the same as a length D2 of a corresponding portion of the belt 1224 in that region. In the flexed position shown in FIG. 12C, the varying radius R1 of the flex region 1215 causes a variation in the flex radius R2 of the belt 1224. That is, the flexing of the platform 1210 flexes causes a variation (i.e., an increase) in the length D2' of the belt 1224 required to accommodate the flex of the platform 1210, as the belt 1224 is positioned radially outward from the center of flexure of the flex region 1215 of the platform 1210. Without correction, or compensation, this variation in length of the belt 1224 required to accommodate the flex of the platform 1210, and corresponding variation on the tension on the belt 1224, could cause non-uniform movement of the belt 1224, slippage/release of the belt 1224, and instability in the user's return movement.

In some implementations, a linkage assembly 1290 may be coupled to a bottom portion of the platform 1210, as shown in FIGS. 12B and 12D. The linkage assembly 1290 may maintain a substantially uniform level of tension on the belt 1224, or a target amount of tension on the belt 1224, as the platform 1210 moves through the range of flexure provided by the flex region 1215. The substantially uniform level of tension on the belt 1224, or the target amount of tension on the belt 1224, provided by the linkage assembly 1290 through the range of flexure of the platform 1210, from, for example, the un-flexed state shown in FIGS. 12A and 12B to the substantially fully flexed state shown in FIGS. 12C and 12D, may provide for substantially uniform, stable movement of the belt 1224 through the return movement.

As noted above, FIGS. 12B and 12D are partial bottom views of the exemplary motorized shoe assembly 1200, in the neutral state, and the flexed state, respectively. Simply to provide an unobstructed view of the components of the linkage assembly 1290, the belts 1224 are not shown on the wheels 1221 in FIGS. 12B and 12D.

As shown in FIGS. 12B and 12D, the linkage assembly 1290 may include a push-pull link 1292, or linkage arm 1292, having a first end portion thereof coupled, for example, rotatably coupled, to a stationary support block 1291, or first stationary block 1291, and a second end portion thereof extending through an intermediate support block 1293, or second stationary block 1293, for coupling, for example, rotatably coupling, to a movable spring seating block 1295, or first movable block 1295. In this example arrangement, wheels 1221 are coupled to the first stationary block 1291, the second stationary block 1293 and a movable front support block 1297, or second movable block 1297, to guide belts 1224 positioned on opposite lateral sides of the linkage assembly 1290. A first guide rod 1294A and a second guide rod 1294B each have a respective first end thereof coupled to the second stationary block 1293. Respective intermediate portions of the first and second guide rods 1294A, 1294B extend through the first movable block 1295 so that respective second end portions of the first and second guide rods 1294A, 1294B may be movably received in the second movable block 1297. A first tension spring 1296A may be positioned on the first guide rod 1294A, and a second tension spring 1296B may be positioned on the second guide rod 1294B, between the first movable block 1295 and the second movable block 1297. In the exemplary arrangement shown in FIGS. 11C and 11E, the linkage assembly 1290 includes two guide rods 1294 and two tension springs 1296. In some implementations, the linkage assembly 1290 may include fewer, or more, guide rods 1294 and/or tension springs 1296.

In the neutral position shown in FIGS. 12A and 12B, the first movable block 1295 and the second movable block 1297 are each in a first position relative to the bottom surface of the platform 1210. With the first movable block 1295 and the second movable block 1297 in the first position, the second end portion of the linkage arm 1292 is positioned between the second stationary block 1293 and the first movable block 1295, and the second end portions of the first and second guide rods 1294A, 1294B are received in the second movable block 1297, or in a retracted state in the second movable block 1297.

Flexing in the flex region 1215 of the platform 1210, as shown in FIGS. 12C and 12D, causes the first movable block 1295 (attached to the second end portion of the linkage arm 1292) and the second movable block 1297 to move, together with the linkage arm 1292, from their respective first positions to respective second positions relative to the bottom surface of the platform 1210, for example, in the direction of the arrow F, along the first and second guide rods 1294A, 1294B. That is, the fixed length linkage arm 1292, the first movable block 1295 and the second movable block 1297 move together in response to the flexing of the platform 1210, which the second stationary block 1293 and the guide rods 1294A, 1294B remain fixed. This movement of the first movable block 1295 and the second movable block 1297 is caused by the change in the radius of flexure described above, and the corresponding variation in the tension on the belts 1224 (coupled on the wheels 1221) as the flexure of the platform 1210 varies.

As shown in FIG. 12C, the rotatable coupling of the linkage arm 1292 to the first stationary block 1291 and the first movable block 1295 allows for rotatable adjustment of the position of the linkage arm 1292 in response to the flexing of the platform 1210, while remaining at a fixed length. The flexed position shown in FIGS. 12C and 12D may illustrate a state of substantially maximum tension in the belts 1224 (for example, a fully flexed state of the platform 1210), compared to the baseline (for example, substantially minimum) tension in the belts 1224 in the neutral state shown in FIGS. 12A and 12B (for example, an un-flexed state of the platform 1210). Whether in the neutral, or un-flexed position, or in the fully flexed position, the first and second tension springs 1296A, 1296B remain compressed, or in tension, to bias the linkage assembly 1290 and maintain a substantially uniform level of tension on the belts 1224 throughout the range of flexure allowed by the flex region 1215 of the platform 1210, thus avoiding abrupt changes in the tension level of the belts 1224 as the platform 1210 and returns to neutral, and avoiding instability as the user is returned to the physical return zone 350A/operational zone 350 under the power of the motorized shoe assembly 1200.

As previously described, in response to detection of the motorized shoe 1200 at, or near, or approaching, a physical boundary of the operational zone 350, the system may transmit a signal to the processing device 1250, causing the processing device 1250 to actuate the motor 1240 to supply power to the locomotion device 1220. Operation of the locomotion device 220, for example, a driving of one or more of the wheels 1221 to turn the belts 1224 of the example motorized shoe assembly 1200 shown in FIGS. 11 and 12A-12D may convey the user wearing the motorized shoe assembly 1200, back into a designated (e.g., a more central) portion of the physical operational zone 350, such as, for example, the return zone 350A described above. This re-positioning of the user into the operational zone 350 may allow the user substantially uninterrupted physical movement, or walking, in the physical environment 300, and corresponding substantially uninterrupted virtual movement in the virtual environment 400, as described above in more detail with respect to FIGS. 3A-3C.

As previously described, in some implementations, an amount of power supplied from the motor 1240 to the locomotion device 1220 may affect, for example, a speed at which the one or more wheels 1221 are driven, and the corresponding movement speed of the belts 1224. An amount of power to be supplied by the motor 1240 and/or a speed at which the locomotion device 1220 is to operate may be determined based on, for example, a physical size of the operational zone 350, a physical distance the user is to be moved through the operation of the locomotion device 1220, a physical speed/acceleration of the user's physical movement, characteristics of the physical environment 300 such as floor surface characteristics and/or the like, characteristics of the virtual environment 400 in which the user is immersed, a physical size/weight of the user, a user's experience level, and numerous other factors. Continued tracking of the physical position of the motorized shoe assembly 1200 in the physical environment 300 may allow the system to detect if and/or when the motorized shoe assembly 1200 is in the desired return zone 350A within the physical operational zone 350. As described above, the motorized shoe assembly 1200 may be set (e.g., pre-programmed) to return to the return zone 350A, to facilitate (e.g., optimize) the continued physical movement of the user within the boundaries of the physical operational zone 350. A size and/or shape of the return zone 350A may vary, based on, for example, a size of the physical operational zone 350, an amount and/or speed and/or acceleration of the user's physical movement, environmental characteristics of the physical environment 300 and/or the virtual environment 400, and/or numerous other factors. As described above, in some implementations, when it is detected that the motorized shoe assembly 1200 is in the return zone 350A, the system may pause, or temporarily suspend, operation of the motor 1240 and/or subsequent power to the locomotion device 1220. The system may resume operation of the motor 1240 and/or power to the locomotion device 1220 upon detection of the motorized shoe assembly 1200 once again at or near the boundary of the physical operational zone 350. As also described in detail above, the tracking of the physical position of the motorized shoe 200 may also be used to determine a particular point at which to apply power from the motor 1240 to the locomotion device 1220, and/or to suspend the supply of power. For example, in some implementations, the operation of the motor 1240 may be maintained until the motorized shoe assembly 1200 is detected within the return zone 350A. In some implementations, the operation of the motor 1240 may be maintained for a set amount of time (for example, an estimated amount of time for the motorized shoe assembly 1200 to return from a current position back into the return zone 350A, based on rotational characteristics of the wheels 1221, movement speed of the belt 1224, and the like). In some implementations, the locomotion device 1220 of the motorized shoe assembly 1200 may operate substantially continuously, so as to substantially continuously convey the user back into the return zone 350A, based on numerous factors described in detail above.

Figure 13A:
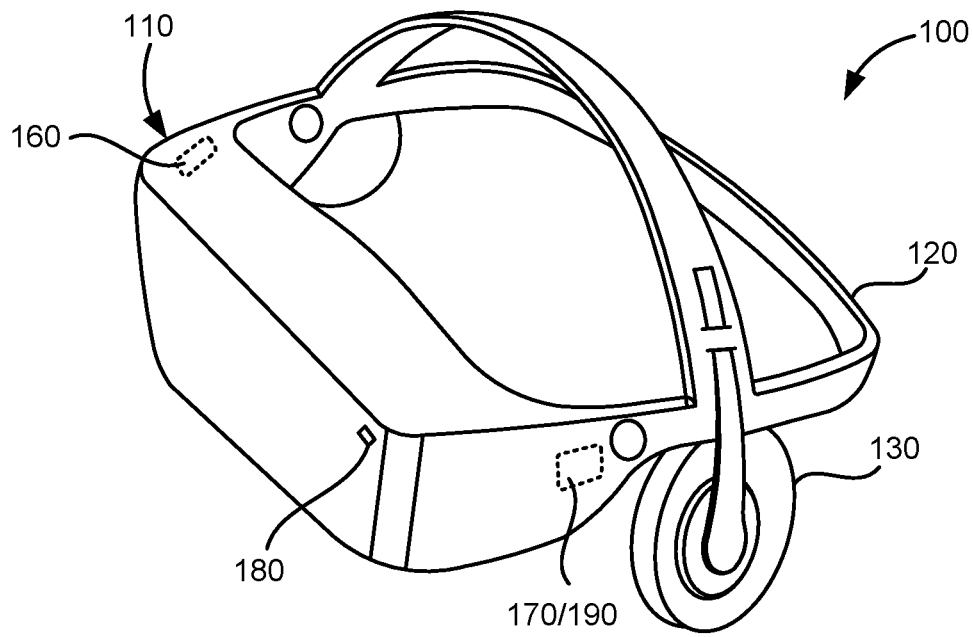
FIGS. 13A-13B are perspective views of an example head mounted display device, in accordance with implementations described herein.
Figure 13B:
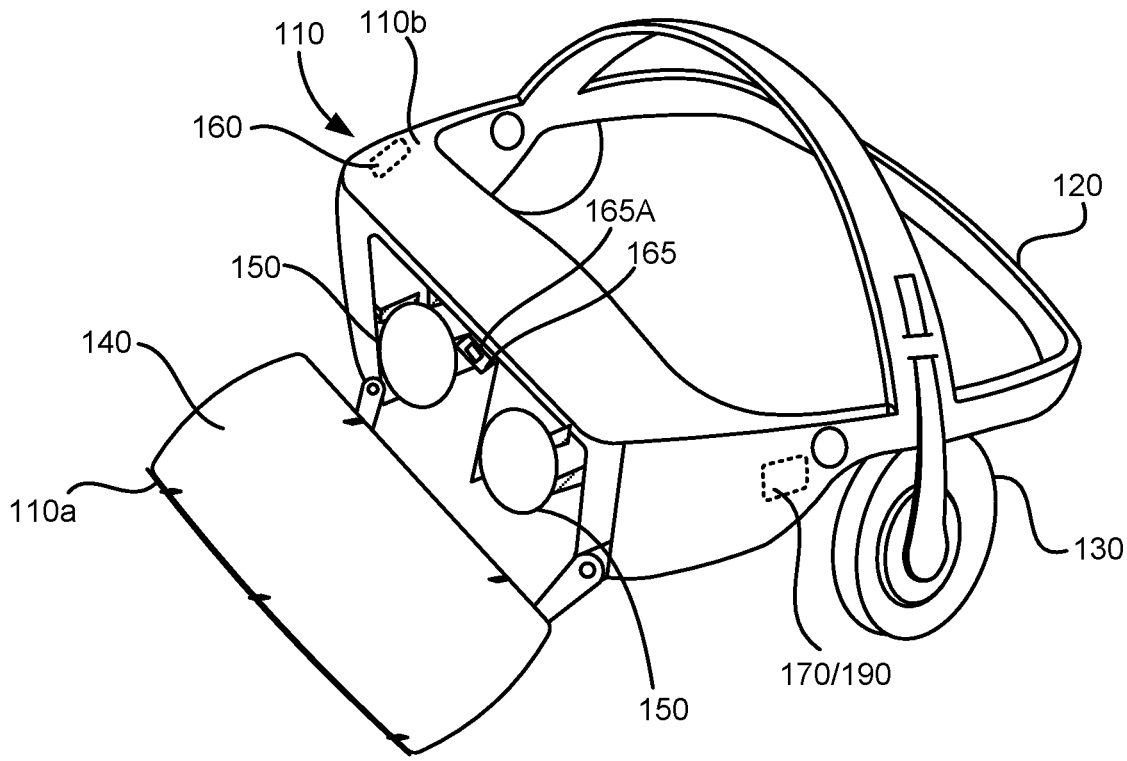

FIGS. 13A-13B are perspective views of an example HMD, such as, for example, the HMD 100 discussed above. The HMD 100 may include a housing 110 coupled, for example, rotatably coupled and/or removably attachable, to a frame 120. An audio output device 130 including, for example, speakers mounted in headphones, may also be coupled to the frame 120. In FIG. 13B, a front portion 110A of the housing 110 is rotated away from a base portion 110B of the housing 110 so that an interior of the housing 110 is visible. A display 140 may be mounted on the front portion 110A of the housing 110. Lenses 150 may be mounted in the housing 110, between the user's eyes and the display 140 when the front portion 110A is in the closed position against the base portion 110B of the housing 110. In some implementations, the HMD 100 may include a sensing system 160 including various sensors and a control system 170 including a processor 190 and various control system devices to facilitate operation of the HMD 100. In some implementations, the HMD 100 may include a camera 180 to capture still and moving images of the physical environment outside of the HMD 100. In some implementations, the HMD 100 may include an optical tracking device 165 including, for example, one or more image sensors 165A, to detect and track user eye movement and activity which may be processed as user input.

In an augmented reality and/or a virtual reality system, a user may physically move in the physical environment in which the system is operated. The system may track the user's movement in the physical environment, and cause corresponding movement in the virtual environment, to generate a sense of presence in the virtual environment. In an augmented reality and/or a virtual reality system, in accordance with implementations described herein, the system may track a physical position and movement of a motorized shoe assembly worn by the user. They system may operate one or more locomotion device(s) of the motorized shoe assembly to move a user back into a physical return zone defined in a physical space, upon detection of the motorized shoe assembly at, or near, a physical boundary of the physical operational zone in the physical environment. This may allow the user relatively uninterrupted physical movement in the physical environment, and corresponding relatively uninterrupted virtual movement in the virtual environment, thus enhancing the user's virtual experience.

Figure 14:
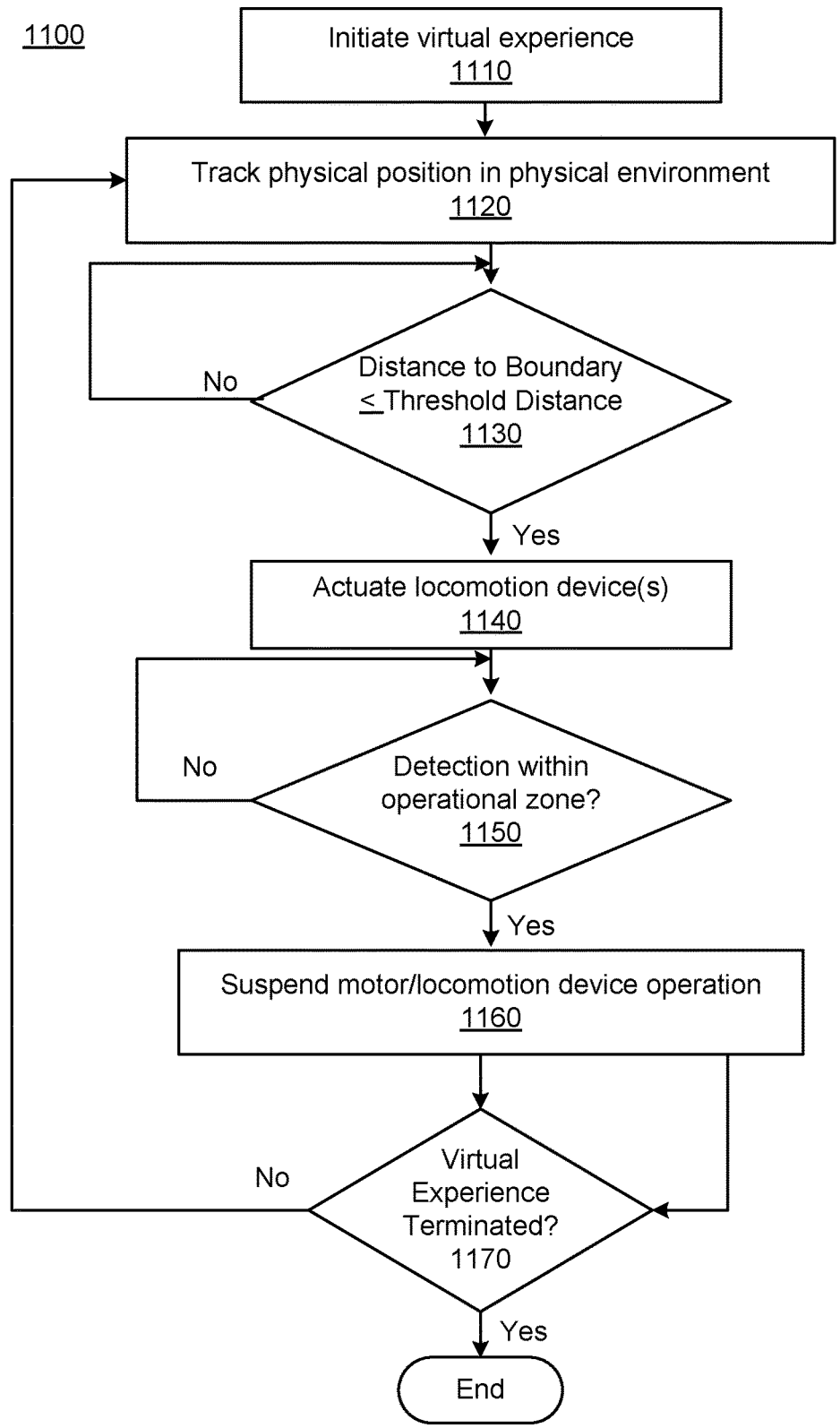
FIG. 14 is a flowchart of an example method of operating an augmented and/or virtual reality system, in accordance with implementations described herein.

An example method of operating an augmented and/or virtual reality system, in accordance with implementations described herein, is shown in FIG. 14.

A virtual immersive experience may be initiated, and displayed, for example, on a display of an HMD as described above (block 1110). Movement of the user during the virtual experience may be tracked (block 1120). This movement tracking may include tracking a physical position of motorized shoes worn by the user, as described above. In particular, the system may track a position of the motorized shoes relative to a previously defined physical operational zone within the physical environment in which the system is operated. When it is determined that one, or both, of the motorized shoes is within a previously defined threshold distance of a physical boundary of the operational zone (block 1130), the system may actuate a motor of the motorized shoes (block 1140). Actuation of the motor may operate a locomotion device, such as, for example, wheels, rollers, belts, treads and the like, of the motorized shoes, to move the user back into a central portion, or return zone, of the physical operational zone. When the tracking of the physical position of the motorized shoes indicates the motorized shoes (and thus the user) is in the return zone (block 1150), the system may temporarily suspend operation of the motor, or place the motor in a standby mode (block 1160) until one, or both of the motorized shoes is once again detected at, or near, the boundary of the operational zone. This process may continue until the virtual experience is terminated (block 1170).

Figure 15:
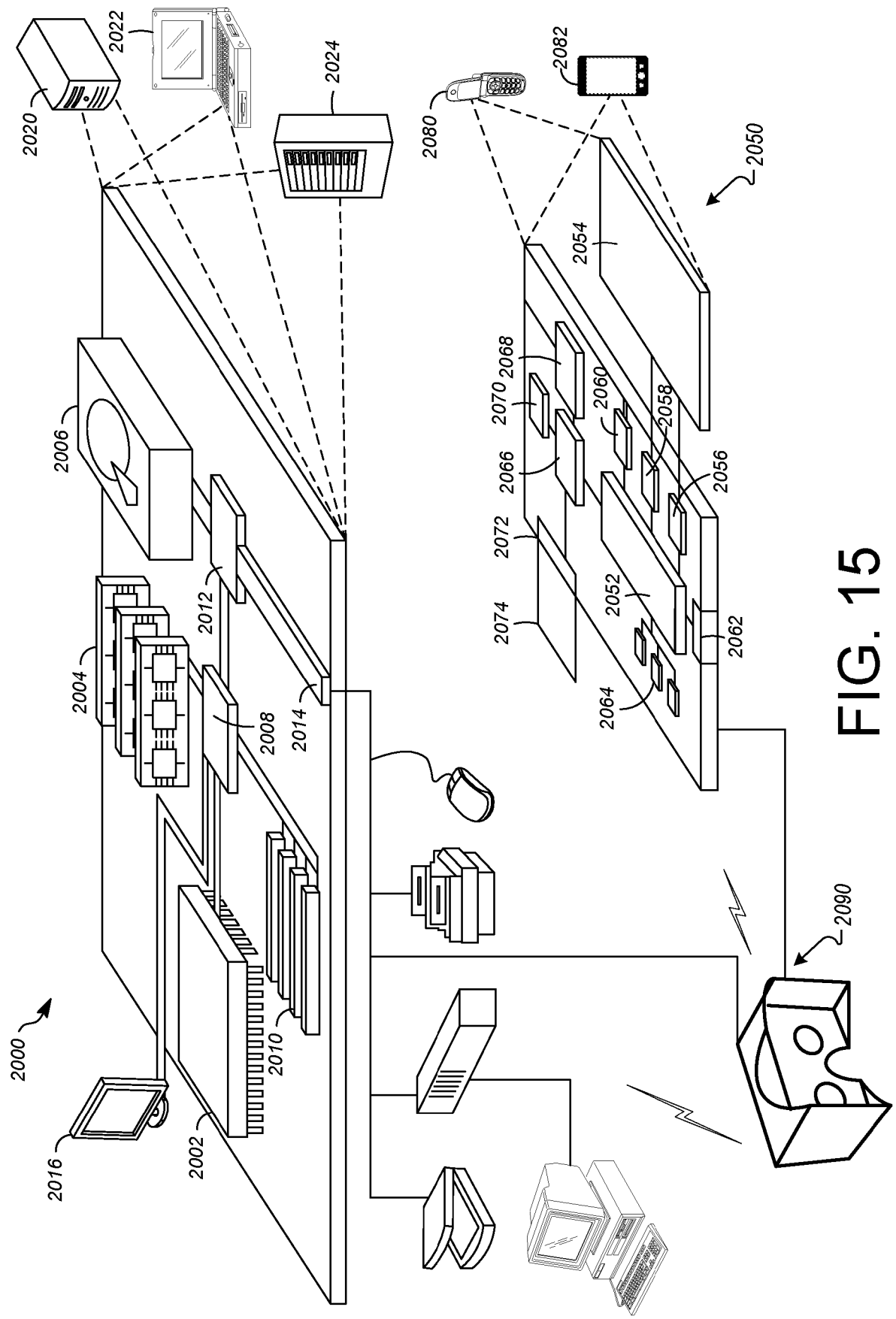
FIG. 15 illustrates an example of a computer device and a mobile computer device that can be used to implement the techniques described here.

FIG. 15 shows an example of a computer device 2000 and a mobile computer device 2050, which may be used with the techniques described here. Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, Wi-Fi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 15 can include sensors that interface with a virtual reality (VR headset/HMD device 2090). For example, one or more sensors included on a computing device 2050 or other computing device depicted in FIG. 15, can provide input to VR headset 2090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 2050 can use the sensors to determine an absolute position and/or a detected rotation of the computing device in the VR space that can then be used as input to the VR space. For example, the computing device 2050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 2050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 2050 when the computing device is incorporated into the VR space can cause a particular action to occur in the VR space.

In some implementations, a touchscreen of the computing device 2050 can be rendered as a touchpad in VR space. A user can interact with the touchscreen of the computing device 2050. The interactions are rendered, in VR headset 2090 for example, as movements on the rendered touchpad in the VR space. The rendered movements can control virtual objects in the VR space.

In some implementations, one or more output devices included on the computing device 2050 can provide output and/or feedback to a user of the VR headset 2090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 2050 may appear as another object in a computer-generated, 3D environment. Interactions by the user with the computing device 2050 (e.g., rotating, shaking, touching a touchscreen, swiping a finger across a touch screen) can be interpreted as interactions with the object in the VR space. In the example of the laser pointer in a VR space, the computing device 2050 appears as a virtual laser pointer in the computer-generated, 3D environment. As the user manipulates the computing device 2050, the user in the VR space sees movement of the laser pointer. The user receives feedback from interactions with the computing device 2050 in the VR environment on the computing device 2050 or on the VR headset 2090.

In some implementations, a computing device 2050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 2000 is intended to represent various forms of digital computers and devices, including, but not limited to laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A motorized shoe assembly, comprising:
   a platform;
   a flex region provided on a bottom surface portion of the platform, between a first portion of the platform and a second portion of the platform, the platform being configured to flex at the flex region through a range of flexure, between a neutral state and a fully flexed state;
   a locomotion device coupled to the bottom surface portion of the platform, including:
      a plurality of wheels; and
      at least one belt coupled to the plurality of wheels, the plurality of wheels configured to guide movement of the at least one belt;
   a motor coupled to the platform and selectively providing power to the locomotion device to selectively operate the locomotion device; and
   a linkage assembly coupled to the bottom surface portion of the platform, and coupled to the locomotion device, wherein the linkage assembly includes a linkage arm extending between the first and second portions of the platform, wherein the linkage arm is rotatable relative to the platform so as to maintain a target amount of tension on the at least one belt through the range of flexure of the platform.

2. The motorized shoe assembly of claim 1, wherein the locomotion device includes:
   a first plurality of wheels arranged along a first lateral side of the linkage assembly on the bottom surface portion of the platform;
   a first belt coupled to the first plurality of wheels, wherein the first plurality of wheels guide movement of the first belt;
   a second plurality of wheels arranged along a second lateral side of the linkage assembly, opposite the first lateral side thereof, on the bottom surface portion of the platform; and
   a second belt coupled to the second plurality of wheels, wherein the second plurality of wheels guide movement of the second belt.

3. The motorized shoe assembly of claim 2, wherein the motor is configured to:
   supply power to a first wheel of the first plurality of wheels to rotate the first wheel of the first plurality of wheels;
   move the first belt coupled to the first plurality of wheels in response to the rotation of the first wheel of the first plurality of wheels, the movement of the first belt being guided by the first plurality of wheels;
   simultaneously supply power from the motor to a first wheel of the second plurality of wheels to rotate the first wheel of the second plurality of wheels; and
   simultaneously move the second belt coupled to the second plurality of wheels in response to the rotation of the first wheel of the second plurality of wheels, the movement of the second belt being guided by the second plurality of wheels.

4. The motorized shoe assembly of claim 1, wherein the linkage assembly includes:
   a first stationary block coupled to the bottom surface portion of the platform;
   a second stationary block coupled to the bottom surface portion of the platform;
   a first movable block movably coupled to the second stationary block;
   a second movable block movably coupled to the second stationary block; and
   a linkage arm having a first end thereof rotatably coupled to the first stationary block and a second end thereof rotatably coupled to the first movable block.

5. The motorized shoe assembly of claim 4, wherein the linkage assembly also includes:
   a first guide rod having a first end portion thereof fixed to the second stationary block and a second end portion thereof extending through the first movable block and into the second movable block;
   a second guide rod having a first end portion thereof fixed to the second stationary block and a second end portion thereof extending through the first movable block and into the second movable block;
   a first tension spring positioned on the first guide rod, between the first movable block and the second movable block; and
   a second tension spring positioned on the second guide rod, between the first movable block and the second movable block.

6. The motorized shoe assembly of claim 5, wherein the first movable block and the second movable block are configured to move in a first direction along the first and second guide rods in response to a movement of the platform from the neutral state to a flexed state, and to move in a second direction, opposite the first direction, along the first and second guide rods in response to a movement of the platform from the flexed state toward the neutral state.

7. The motorized shoe assembly of claim 6, wherein the first tension spring and the second tension spring are configured to remain in tension as the platform moves through the range of flexure.

8. The motorized shoe assembly of claim 1, further comprising a processing device operably coupling the motorized shoe assembly with an external computing device, the processing device including a tracking device that is trackable by the external computing device for tracking a physical position of the motorized shoe assembly.

9. The motorized shoe assembly of claim 8, wherein, in response to a detection of movement of the motorized shoe assembly in a first direction and a detection that a physical distance between the motorized shoe assembly and a physical boundary of a physical operational zone defined a physical environment is less than or equal to a threshold distance, the processing device is configured to:
   supply power from the motor to operate the locomotion device, to move the motorized shoe assembly in a second physical direction that is different from the first physical direction, toward a return zone defined within the physical operational zone.

10. The motorized shoe assembly of claim 9, wherein, in response to a detection of the motorized shoe assembly in the return zone, the processing device is configured to suspend the supply of power from the motor to suspend operation of the locomotion device.

11. The motorized shoe assembly of claim 1, further comprising a power supply device remotely coupled to the motor.

12. A method, comprising:
tracking a physical position of at least one motorized shoe in a physical environment;
detecting a distance between the at least one motorized shoe and a physical boundary of a physical operational zone defined in the physical environment;
comparing the detected distance to a threshold distance;
actuating a locomotion device of the at least one motorized shoe in response to a detection of the at least one motorized shoe within the threshold distance to the physical boundary of the physical operational zone when the detected distance is less than or equal to the threshold distance based on the comparison; and
moving the at least one motorized shoe into a physical return zone defined within the physical operational zone in response to actuation of the locomotion device to maintain a physical position of the at least one motorized shoe within the physical operational zone.

13. The method of claim 12, wherein the moving of the at least one motorized shoe into the physical return zone includes:
transmitting power generated by a motor to the locomotion device of the at least one motorized shoe via a power transmission device; and
rotating the locomotion device in a direction to convey the at least one motorized shoe toward the return zone.

14. The method of claim 12, the method further comprising:
displaying, in a head mounted display device, a virtual environment; and
moving virtual elements of the virtual environment to correspond to tracked physical movement of the at least one motorized shoe in a first physical direction.

15. The method of claim 14, wherein the moving of the at least one motorized shoe into the return zone includes:
moving the at least one motorized shoe in a second physical direction that is different from the first physical direction; and
maintaining a virtual arrangement of the virtual elements of the virtual environment as the at least one motorized shoe moves in the second physical direction.

16. The method of claim 12, wherein actuating the locomotion device includes:
supplying power from a motor to at least one wheel, of a plurality of wheels, of the locomotion device, to rotate the at least one wheel; and
moving a belt coupled to the plurality of wheels in response to the rotation of the at least one wheel, the movement of the belt being guided by the plurality of wheels.

17. The method of claim 16, further comprising:
suspending the supply of power to the at least one wheel to suspend operation of the locomotion device when the detected distance is greater than the threshold distance based on the comparison.

18. The method of claim 16, wherein actuating the locomotion device includes:
supplying power from the motor to a first wheel of a first plurality of wheels on a first lateral side of a platform of the at least one motorized shoe to rotate the first wheel of the first plurality of wheels;
moving a first belt coupled to the first plurality of wheels in response to the rotation of the first wheel of the first plurality of wheels, the movement of the first belt being guided by the first plurality of wheels;
simultaneously supplying power from the motor to a first wheel of a second plurality of wheels on a second lateral side of the platform of the at least one motorized shoe to rotate the first wheel of the second plurality of wheels; and
simultaneously moving a second belt coupled to the second plurality of wheels in response to the rotation of the first wheel of the second plurality of wheels, the movement of the second belt being guided by the second plurality of wheels.

19. A motorized shoe assembly, including:
a platform;
a motor;
a locomotion device coupled to the platform;
a power transmission device coupling the motor and the locomotion device;
a processing device operably coupling the motorized shoe assembly with an external computing device, the processing device including:
a tracking device that is trackable by the external computing device for tracking a physical position of the motorized shoe assembly;
a processor; and
a non-transitory computer-readable storage medium storing instructions that, when executed, cause the processor to:
detect a distance between the motorized shoe assembly and a physical boundary of a physical operational zone defined in a physical environment that is less than or equal to a threshold distance;
actuate the motor in response to the detection of the motorized shoe assembly within the threshold distance to the boundary of the operational zone; and
move the motorized shoe assembly in toward a physical return zone defined within the physical operational zone in response to actuation of the motor to maintain a position of the motorized shoe within the physical operational zone.

20. The motorized shoe assembly of claim 19, wherein instructions, when executed, also cause the processor to:
detect a distance between the motorized shoe assembly and the physical boundary of the physical operational zone that is greater than the threshold distance;
detect the motorized shoe assembly within the physical return zone; and
suspend operation of the motor in response to the detection of the motorized shoe assembly in response to the detection of the motorized shoe assembly within the physical return zone.

* * * * *